US012513440B2

(12) United States Patent
Tachi et al.

(10) Patent No.: US 12,513,440 B2
(45) Date of Patent: Dec. 30, 2025

(54) SPEAKER

(71) Applicant: ALPS ALPINE CO., LTD., Tokyo (JP)

(72) Inventors: Ryosuke Tachi, Fukushima (JP); Ryo Ito, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 148 days.

(21) Appl. No.: 18/643,261

(22) Filed: Apr. 23, 2024

(65) Prior Publication Data

US 2024/0365034 A1 Oct. 31, 2024

(30) Foreign Application Priority Data

Apr. 27, 2023 (JP) ................................ 2023-073074

(51) Int. Cl.
*H04R 1/02* (2006.01)
*H04R 1/34* (2006.01)

(52) U.S. Cl.
CPC ............. *H04R 1/023* (2013.01); *H04R 1/345* (2013.01); *H04R 2217/03* (2013.01); *H04R 2499/13* (2013.01)

(58) Field of Classification Search
CPC .... H04R 1/023; H04R 1/345; H04R 2217/03; H04R 2499/13
USPC .......................................................... 381/189
See application file for complete search history.

(56) References Cited

U.S. PATENT DOCUMENTS

2006/0109989 A1 5/2006 Linhard
2013/0208925 A1 8/2013 Hayes
2019/0253792 A1* 8/2019 Ogura .................... G10K 11/30

FOREIGN PATENT DOCUMENTS

| | | |
|---|---|---|
| EP | 1509063 | 2/2005 |
| JP | 2006-511128 | 3/2006 |
| JP | 2007-237831 | 9/2007 |
| JP | 2012-142659 | 7/2012 |
| WO | 2009113319 | 9/2009 |

OTHER PUBLICATIONS

Extended European Search Report for 24171834.5 mailed on Sep. 27, 2024.

* cited by examiner

*Primary Examiner* — Sean H Nguyen
(74) *Attorney, Agent, or Firm* — IPUSA, PLLC

(57) ABSTRACT

A speaker that is configured to emit ultrasonic waves includes an ultrasonic emission unit, a reflector, and a louver unit. The ultrasonic emission unit is configured to emit ultrasonic waves in an emission direction. The reflector is disposed at a side of the ultrasonic emission unit from which the ultrasonic waves are emitted. The reflector is configured to reflect the ultrasonic waves emitted from the ultrasonic emission unit in a predetermined direction. The louver unit is disposed between the ultrasonic emission unit and the reflector. The louver unit includes slits formed therein in a manner such that the slits do not change a direction of the ultrasonic waves between the ultrasonic emission unit and the reflector, and do not change a direction of the ultrasonic waves reflected by the reflector. The louver unit is configured to inhibit entry of foreign matter into the ultrasonic emission unit.

8 Claims, 15 Drawing Sheets

SPEAKER

CROSS-REFERENCE TO RELATED APPLICATIONS

This patent application is based on and claims priority to Japanese Patent Application No. 2023-073074 filed on Apr. 27, 2023, the entire contents of which are incorporated herein by reference.

TECHNICAL FIELD

The present disclosure relates to speakers. Particularly, the speakers discussed herein are suitable as speakers that are disposed on exteriors of bodies of vehicles, and emit ultrasonic waves.

BACKGROUND

Various technologies related to speakers, which emit ultrasonic waves and are designed to be installed on exteriors of bodies of vehicles, have been proposed. For example, a technology of emitting ultrasonic waves from a speaker installed on an exterior of a body of a vehicle towards a target point to generate a virtual sound source at the target point is disclosed in Japanese Unexamined Patent Application Publication No. 2007-237831. According to Japanese Unexamined Patent Application Publication No. 2007-237831, an acoustic space, as if a sound is output from the target point, is created. In recent years, particularly, vehicles that do not have internal combustion engines have become popular, thus it is expected that a demand for the above-described speakers will increase as means for outputting sounds that replace engine noise.

A specific structure of a speaker emitting ultrasonic waves is not disclosed in Japanese Unexamined Patent Application Publication No. 2007-237831, but is disclosed in Japanese Translation of PCT International Application Publication No. 2006-511128. Specifically, it is disclosed that a speaker includes a reflector configured to reflect ultrasonic waves emitted from an ultrasonic emission unit (a parametric speaker), where ultrasonic waves are allowed to be reflected by the reflector to direct the reflected ultrasonic waves in a desired direction.

In a case where a speaker is installed on an exterior of a body of a vehicle, it is important that the speaker can emit ultrasonic waves in a desired direction, while minimizing damages of an ultrasonic emission unit, which may be caused by gravel, dusts, and other foreign matter, considering the nature of the speaker such that the speaker is installed on the exterior of the body of the vehicle. Although a speaker installed on an exterior of a body of a vehicle is disclosed in Japanese Unexamined Patent Application Publication No. 2007-237831, there is however no description regarding prevention of potential damages caused by foreign matter. Moreover, emission of ultrasonic waves in a desired direction is disclosed in Japanese Translation of PCT International Application Publication No. 2006-511128, but there is no description regarding prevention of potential damages caused by foreign matter.

The present disclosure aims to solve the above-described problems and to provide a speaker that is installed on an exterior of a body of a vehicle and is capable of emitting ultrasonic waves in a desired direction, while minimizing potential damages of an ultrasonic emission unit caused by foreign matter.

SUMMARY

According to one aspect of the present disclosure, a speaker that is configured to emit ultrasonic waves includes an ultrasonic emission unit, a reflector, and a louver unit. The ultrasonic emission unit is configured to emit ultrasonic waves in an emission direction. The reflector is disposed at a side of the ultrasonic emission unit from which the ultrasonic waves are emitted. The reflector is configured to reflect the ultrasonic waves emitted from the ultrasonic emission unit in a predetermined direction. The louver unit is disposed between the ultrasonic emission unit and the reflector. The louver unit includes slits formed therein in a manner such that the slits do not change a direction of the ultrasonic waves between the ultrasonic emission unit and the reflector, and do not change a direction of the ultrasonic waves reflected by the reflector. The louver unit is configured to inhibit entry of foreign matter into the ultrasonic emission unit.

BRIEF DESCRIPTION OF THE DRAWINGS

Other objects and further features of the present invention will be apparent from the following detailed description when read in conjunction with the accompanying drawings, in which.

DETAILED DESCRIPTION OF EMBODIMENTS

First Embodiment

Figure 1:
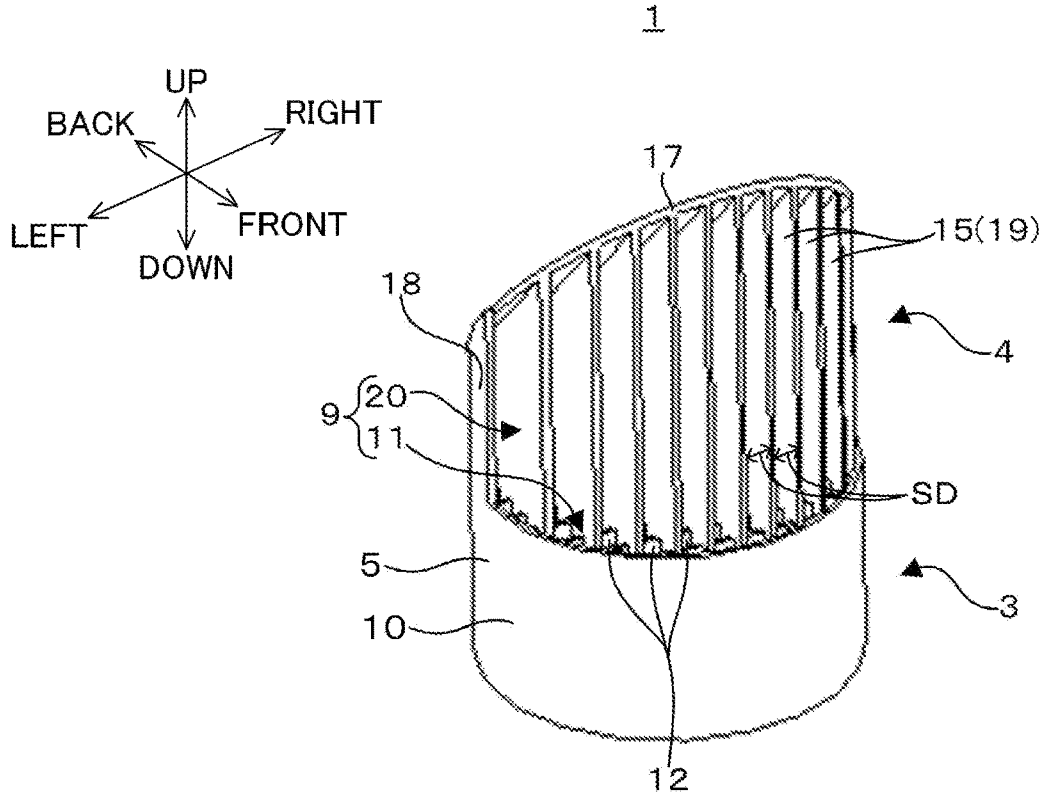
FIG. 1 is a perspective view illustrating a speaker according to a first embodiment of the present disclosure.
Figure 2:
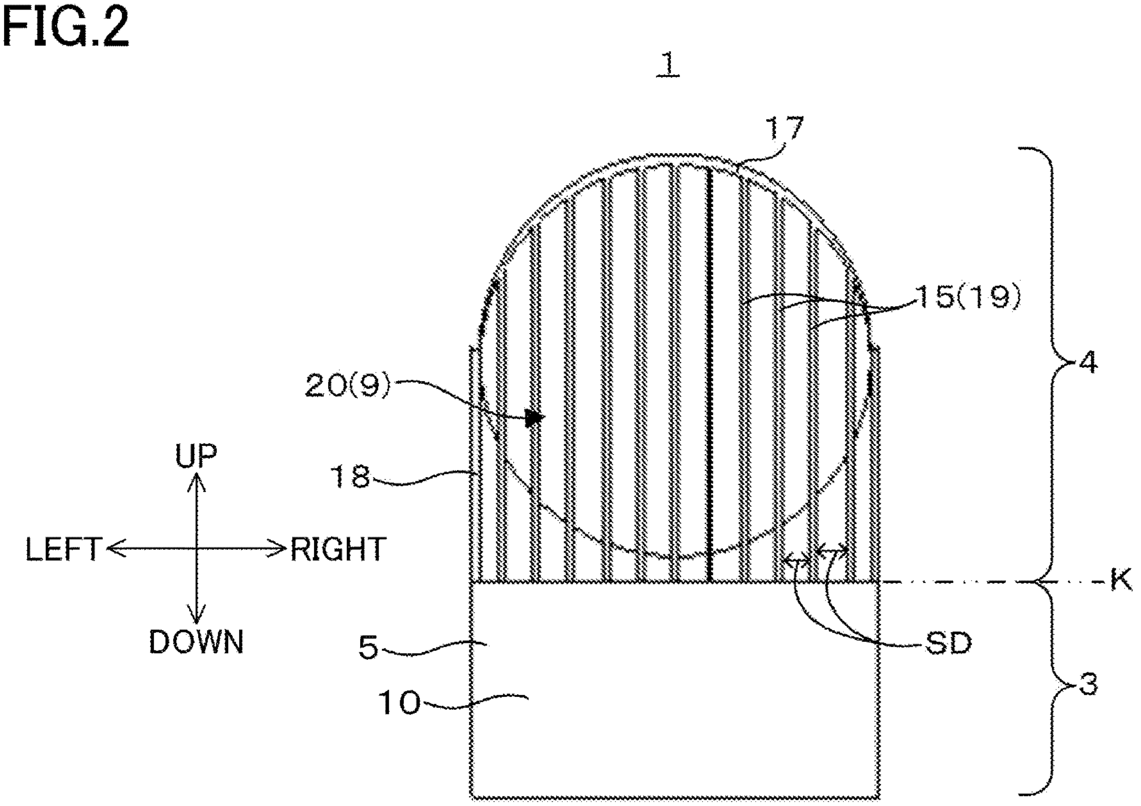
FIG. 2 is a front view illustrating the speaker according to the first embodiment.
Figure 3:
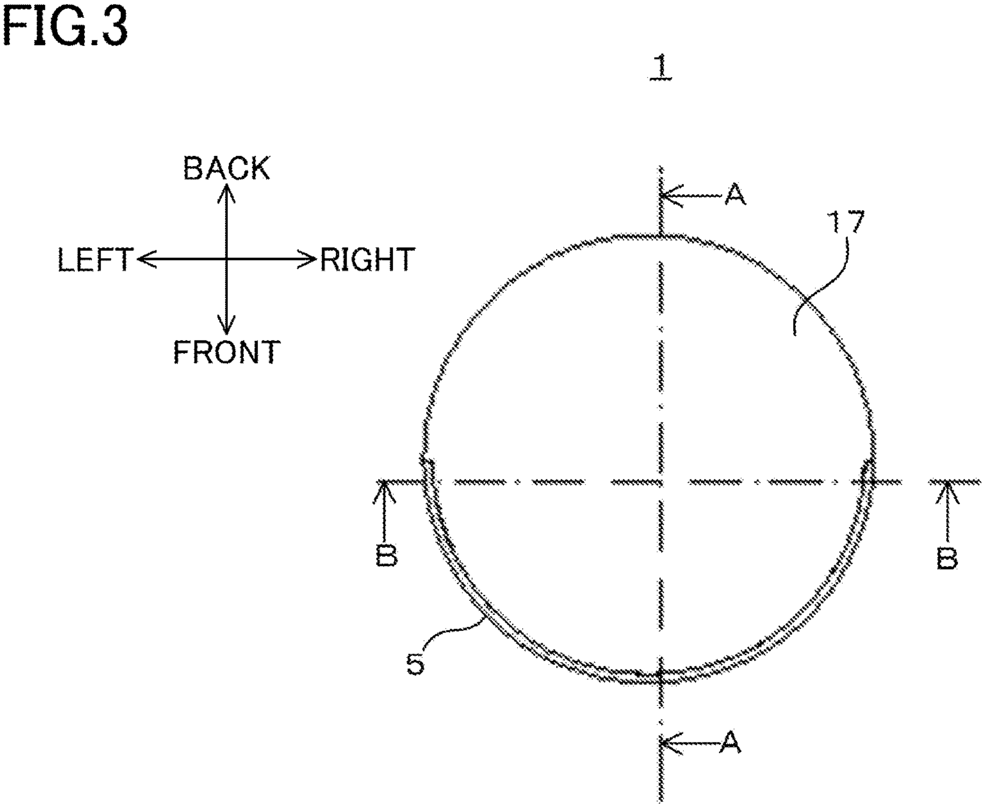
FIG. 3 is a plan view illustrating the speaker according to the first embodiment.
Figure 4:
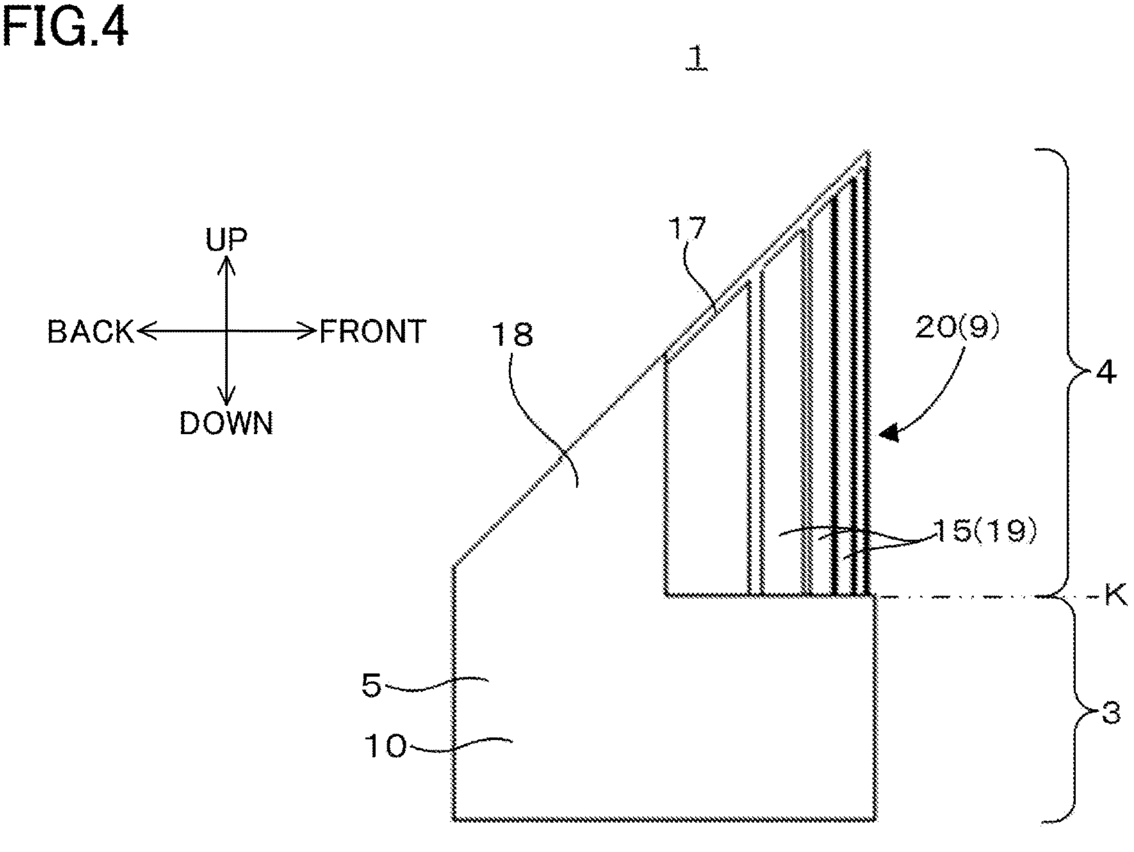
FIG. 4 is a left side view illustrating the speaker according to the first embodiment.
Figure 5:
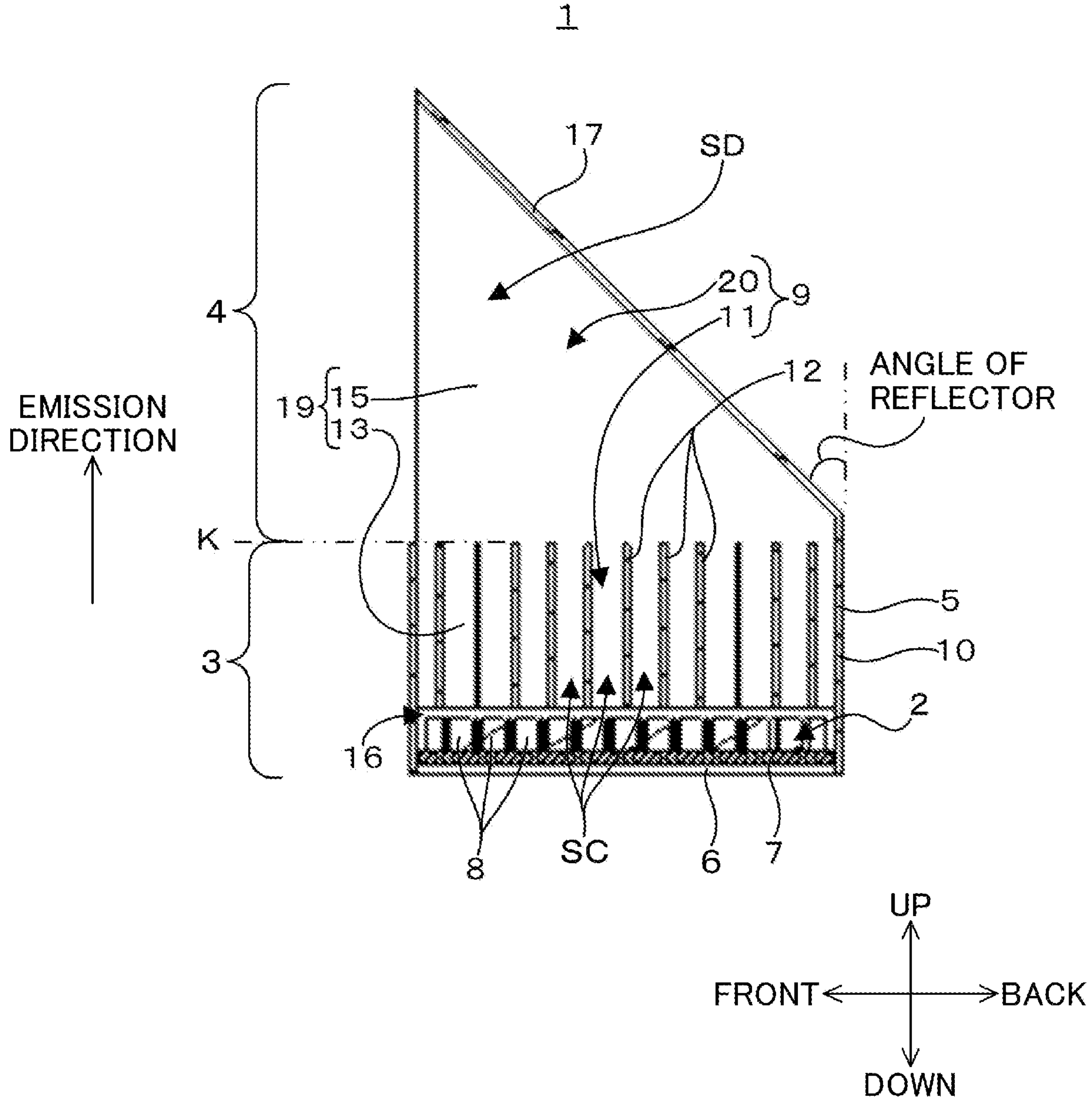
FIG. 5 is a cross-sectional view taken along the line A-A of FIG. 3.
Figure 6:
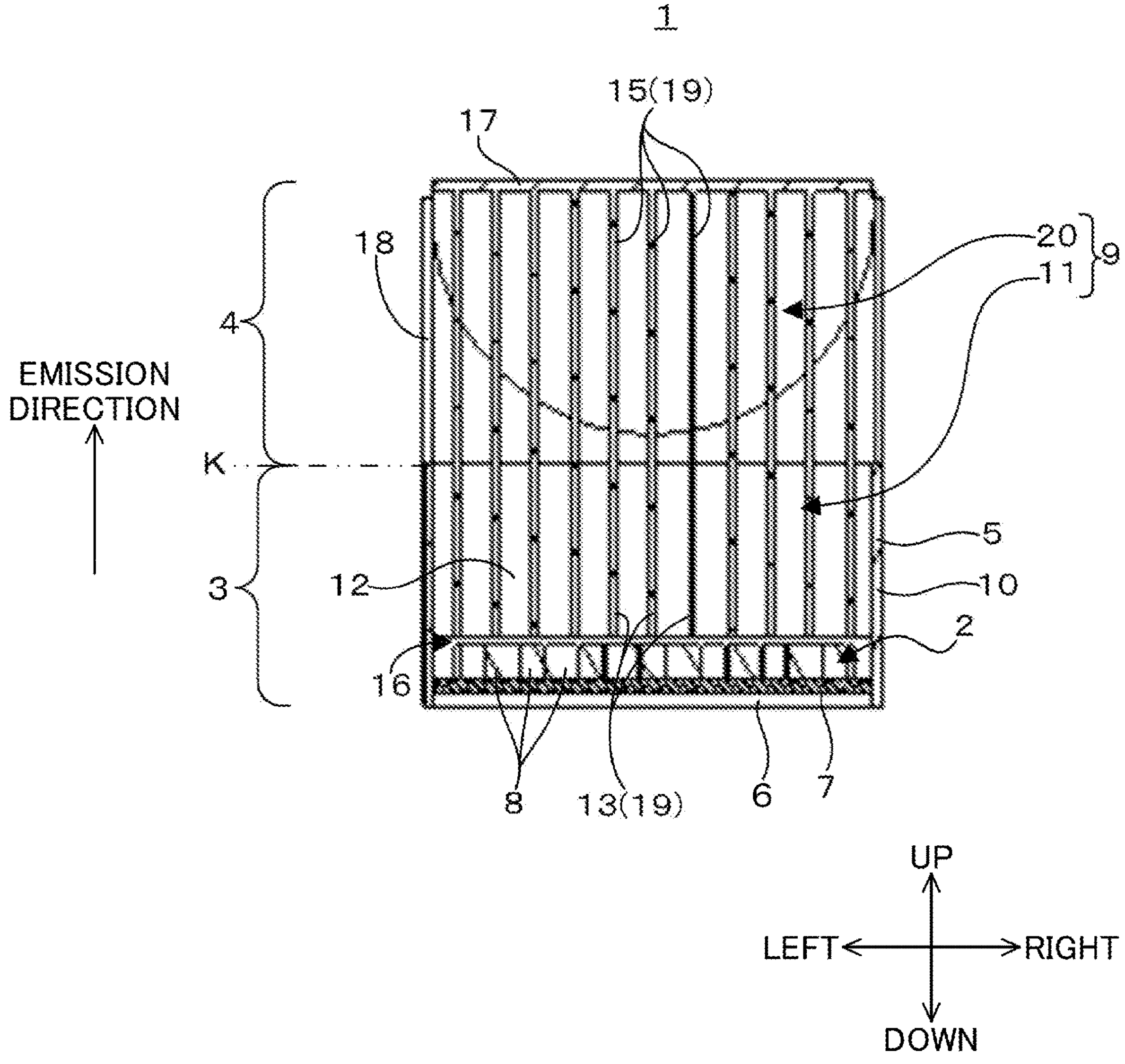
FIG. 6 is a cross-sectional view taken along the line B-B of FIG. 3.

A first embodiment of the present disclosure will be described with reference to drawings, hereinafter. FIG. 1 is a perspective view illustrating a speaker 1 according to the present embodiment. FIG. 2 is a front view of the speaker 1 as viewed from front. FIG. 3 is a plan view of the speaker 1 as viewed from top. FIG. 4 is a left side view of the speaker 1 as viewed from left. FIG. 5 is a cross-sectional view taken along the line A-A of FIG. 3. FIG. 6 is a cross-sectional view taken along the line B-B of FIG. 3. In the present embodiment, directions, i.e., front, back, right, left, up, and down, of the speaker 1 are determined as indicated in each of FIGS. 1 to 6. Moreover, the direction including the front and the back is determined as a “front-back direction”; the direction including the right and the left is determined as a “left-right direction”; and the direction including the up and the down is determined as a “up-down direction.” However, the “directions” determined in the present embodiment are used merely for convenience of description, and are not related to “directions” of the speaker 1 when the speaker 1 is installed on a body of a vehicle.

The speaker 1 according to the present embodiment is a device designed to be installed on an exterior of a body of a vehicle. The speaker 1 is configured to emit ultrasonic waves, which are strongly directional acoustic waves, towards ground or other targets to generate audible sounds at a reaching point of the ultrasonic waves, thereby giving a warning to pedestrians or others, or allowing pedestrians or others to be aware of the presence of a vehicle. However, intended objects or embodiments of use of the speaker 1 are not limited to the above-mentioned objects or embodiments. Since the speaker 1 is installed on an exterior of a body of a vehicle, the speaker 1 is exposed to gravel, dusts, and other foreign matter. In the present embodiment, as will be described below, the ultrasonic emission unit 2 is protected from potential damages caused by foreign matter due to the structural characteristics of the speaker 1.

As illustrated in FIGS. 1, 2, and 4 to 6, the speaker 1 is roughly divided into two parts, a lower speaker portion 3 and an upper speaker portion 4 that is disposed above the lower speaker portion 3. As will be described below, an emission louver 11 is disposed in the lower speaker portion 3, and a reflection louver 20 is disposed in the upper speaker portion 4. The emission louver 11 and the reflection louver 20 constitute a louver unit 9.

The lower speaker portion 3 includes a lower-portion case 5 that is in a shape of a cylinder with a bottom base. An ultrasonic emission unit 2 is disposed on a base plate 6 of the lower-portion case 5. Specifically, the ultrasonic emission unit 2 includes a disc-shaped substrate 7, and a plurality of elements 8 aligned on the substrate 7. The elements 8 are configured to generate compression waves having predetermined wavelengths. Examples of the elements 8 include piezoelectric elements. A back surface of the substrate 7 of the ultrasonic emission unit 2 is fixed onto the base plate 6 of the lower-portion case 5, thereby disposing the ultrasonic emission unit 2 on the base plate 6.

A direction of ultrasonic waves emitted from the ultrasonic emission unit 2 (may be referred to as an “emission direction” hereinafter) is matched with a direction towards “up” defined in the present embodiment, namely, upwards. The emission direction is indicated in FIGS. 5 and 6. An inner circumference of a cylindrical portion 10 that is a cylindrical portion of the lower-portion case 5 functions as an aperture for ultrasonic waves emitted from the ultrasonic emission unit 2.

Figure 7:
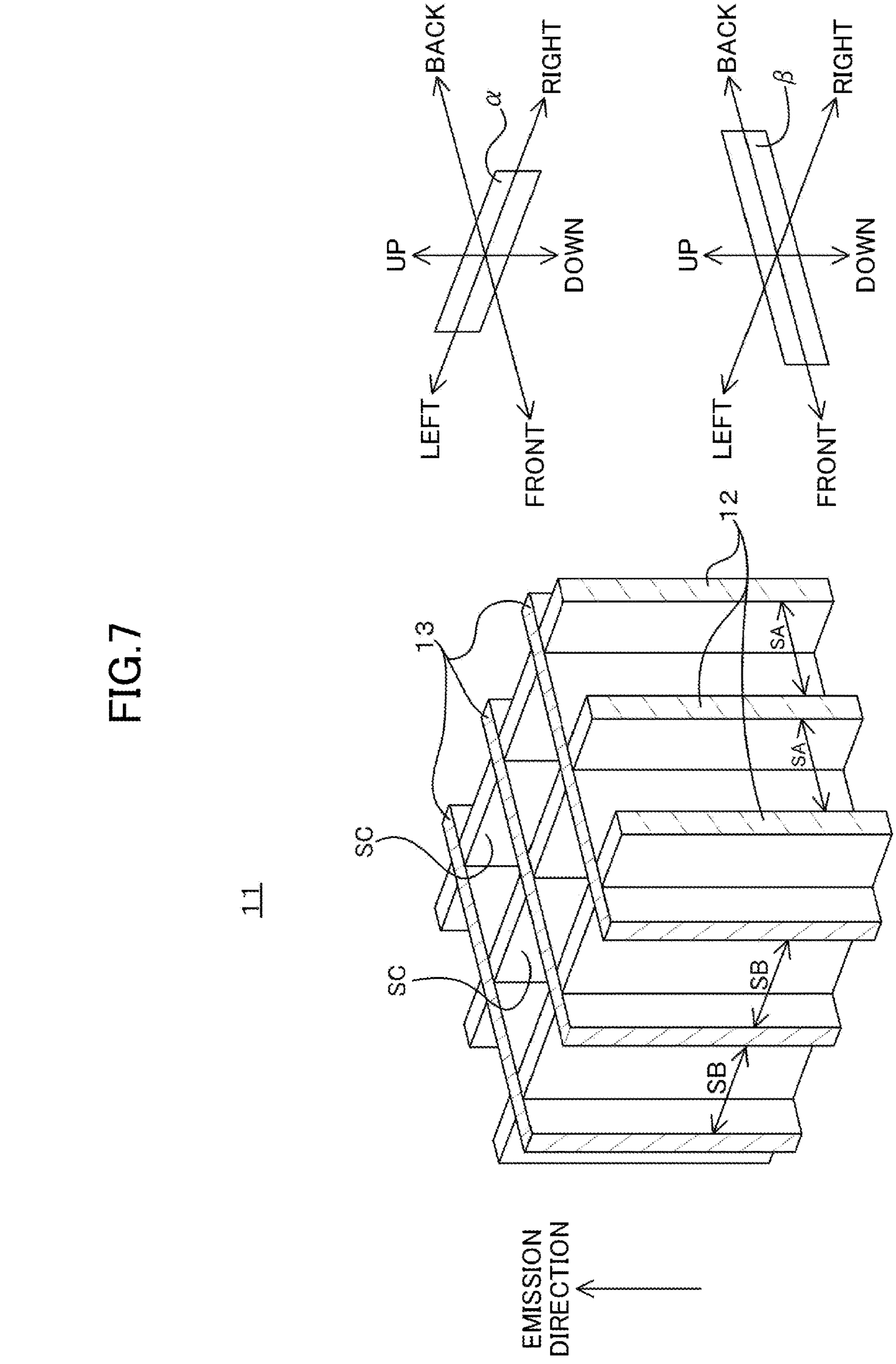
FIG. 7 is a view illustrating part of an emission louver of the speaker according to the first embodiment.

In the lower-portion case 5, the emission louver 11 is disposed above the ultrasonic emission unit 2. The emission louver 11 will be described in detail, hereinafter. The emission louver 11 is made up of two types of slats, lower-portion left-right-extended slats 12 and lower-portion front-back-extended slats 13. The lower-portion left-right-extended slats 12 and the lower-portion front-back-extended slats 13 are both plate-shaped slats. FIG. 7 is a view illustrating a region including three lower-portion left-right-extended slats 12 and three lower-portion front-back-extended slats 13, which is cut out for describing the emission louver 11, together with arrows indicating the front-back direction, the up-down direction, and the left-right direction, and an arrow indicating the emission direction.

As illustrated in FIG. 7, the lower-portion left-right-extended slats 12 are each disposed in a manner such that two surfaces of each lower-portion left-right-extended slat 12 (large surfaces that are not four side surfaces of a thickness portion) are parallel to an imaginary plane α including the top-bottom direction and the left-right direction (an imaginary plane α perpendicular to the front-back direction). The lower-portion left-right-extended slats 12 are aligned along the front-back direction (also see FIG. 5), and a slit SA is formed between the two lower-portion left-right-extended slats 12 next to one another. The lower-portion left-right-extended slats 12 are disposed to form the slits SA that are parallel to the emission direction. The phrase “slits SA that are parallel to the emission direction” means that, when an imaginary line is drawn to extend along the emission direction within each slit SA, the imaginary line does not cross over the above-mentioned surfaces of the lower-portion left-right-extended slat 12.

As illustrated in FIG. 5, the lower-portion left-right-extended slats 12 are aligned at an equal interval over an entire region inside the cylindrical portion 10 of the lower-portion case 5. Each of the lower-portion left-right-extended slats 12 is fastened on the inner circumferential surface of the cylindrical portion 10 of the lower-portion case 5, thereby fixing the lower-portion left-right-extended slats 12 onto the lower-portion case 5. The lower-portion left-right-extended slat 12 at a center of the front-back direction has the largest length in the left-right direction. The lower-portion left-right-extended slats 12 that are positioned forwards (closer to the front) or backwards (closer to the back) with respect to the lower portion left-right-extended slat 12 at the center have the shorter length in the left-right direction.

As illustrated in FIG. 7, the lower-portion front-back-extended slats 13 are each disposed in a manner such that two surfaces of each lower-portion front-back-extended slat 13 (large surfaces that are not four side surfaces of a thickness portion) are parallel to an imaginary plane β including the top-bottom direction and the front-back direction (an imaginary plane β perpendicular to the left-right direction). The lower-portion front-back-extended slats 13 are aligned along the left-right direction, and a slit SB is formed between the two lower-portion front-back-extended slats 13 next to one another. The lower-portion front-back-extended slats 13 are disposed to form the slits SB that are parallel to the emission direction. The phrase the "slits SB that are parallel to the emission direction" means that, when an imaginary line is drawn to extend along the emission direction within each slit SB, the imaginary line does not cross over the above-mentioned surfaces of the lower-portion front-back-extended slat 13.

As illustrated in FIG. 6, the lower-portion front-back-extended slats 13 are aligned at an equal interval over an entire region inside the cylindrical portion 10 of the lower-portion case 5. Each of the lower-portion front-back-extended slats 13 is fastened on the inner circumferential surface of the cylindrical portion 10 of the lower-portion case 5, thereby fixing the lower-portion front-back-extended slats 13 onto the lower-portion case 5. The lower-portion front-back-extended slat 13 at a center of the left-right direction has the largest length in the front-back direction. The lower-portion front-back-extended slats 13 that are positioned towards the right (closer to the right) or towards the left (closer to the left) with respect to the lower-portion front-back-extended slat 13 at the center have the shorter length in the front-back direction.

Figure 8:
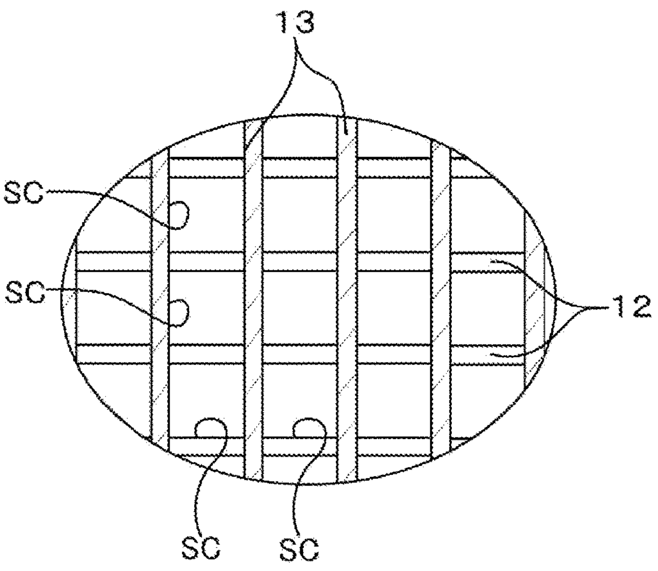
FIG. 8 is a partial view illustrating a cut plane of the speaker according to the first embodiment as viewed from top, where the cut plane is obtained by cutting the speaker along a boundary between a lower speaker portion and an upper speaker portion.

FIG. 8 is a partial view illustrating a simplified state of a cut plane of the speaker 1 as viewed from top, where the cut plane of the speaker 1 is taken along the boundary K between the lower speaker portion 3 and upper speaker portion 4 illustrated in FIGS. 2, 4, 5, and 6. As illustrated in FIGS. 7 and 8, the lower-portion left-right-extended slats 12 and the lower-portion front-back-extended slats 13 are disposed to cross over each other at a right angle (90°) as viewed from top. When the cut plane taken along the boundary K between the lower speaker portion 3 and the upper speaker portion 4 is viewed from top, a lattice shape is formed with the lower-portion left-right-extended slats 12 and the lower-portion front-back-extended slats 13, and square slits SC are formed between the slats in a plan view, as illustrated in the cross-sectional view of FIG. 8. The slits SC are slits parallel to the emission direction. As it will become clear from the description below, each lower-portion front-back-extended slat 13 constitutes an integrated member with each below-described upper-portion front-back-extended slat 15. A cutout is formed in an area of the lower-portion front-back-extended slat 13 that intersects with the lower-portion left-right-extended slat 12. The lower-portion left-right-extended slat 12 is passed through the cutout formed in the lower-portion front-back-extended slat 13. A gap 16 is formed between the lower edge of the emission louver 11 and the upper edge of the ultrasonic emission unit 2.

As described above, the upper speaker portion 4 is formed above the lower speaker portion 3. The reflector 17 is disposed at the upper edge of the upper speaker portion 4. Specifically, the reflector 17 is disposed at a side (an emission direction side) of the ultrasonic emission unit 2 from which ultrasonic waves are emitted. The reflector 17 is a member configured to reflect the ultrasonic waves emitted from the ultrasonic emission unit 2 to reflect the ultrasonic waves in a predetermined direction. The direction of the ultrasonic waves after being reflected by the reflector 17 is referred to as a "direction after reflection (reflected direction)" hereinafter. The reflector 17 is a disc-shaped member. A surface of the reflector 17 facing the ultrasonic emission unit 2 is formed of a material having high reflection efficiencies of ultrasonic waves. The reflector 17 is disposed to incline upwards so that the front end of the reflector 17 becomes higher than the rear end of the reflector 17. As illustrated in FIG. 5, an angle of the reflector 17 with respect to the top-bottom direction is referred to as a "reflector angle" hereinafter. The reflector angle is appropriately set according to a desired direction of ultrasonic waves after reflection.

As illustrated in FIGS. 1, 2, 4, and 6 (particularly FIG. 4), a cylindrical extended portion 18 is extended upwards from the cylindrical portion 10 of the lower-portion case 5 to cross the boundary K between the lower speaker portion 3 and the upper speaker portion 4. The reflector 17 is connected to the cylindrical extended portion 18 and to whole front-back-extended slats 19 (described below). The reflector 17 is supported by the cylindrical extended portion 18 and the whole front-back-extended slats 19.

The reflection louver 20 is disposed in the upper speaker portion 4. The reflection louver 20 will be described in detail, hereinafter. As illustrated in FIGS. 1, 2, 4, 5, and 6, the reflection louver 20 includes upper-portion front-back-extended slats 15 that are plate-like slats. Each of the upper-portion front-back-extended slats 15 constitutes an integrated member with each of the lower-portion front-back-extended slats 13 of the lower speaker portion 3. Each of the upper-portion front-back-extended slat 15 is formed of an extended portion of each of the lower-portion front-back-extended slats 13 crossing the boundary K between the lower speaker portion 3 and the upper speaker portion 4. The upper-portion front-back-extended slats 15 are each disposed in a manner such that two surfaces (large surfaces not four surfaces of a thickness portion) of each upper-portion front-back-extended slat 15 are parallel to an imaginary plane β including the top-bottom direction and the front-back direction (the imaginary plane β perpendicular to the left-right direction) (see FIG. 7).

The upper-portion front-back-extended slats 15 are aligned along the left-right direction, and a slit SD is formed between the two upper-portion front-back-extended slats 15 next to one another. The upper-portion front-back-extended slats 15 are disposed to form the slits SD that are parallel to the emission direction and the direction after reflection (reflected direction). The phrase the "slits SD that are parallel to the emission direction" means that, when an imaginary line is drawn to extend along the emission direction within each slit SD, the imaginary line does not cross over the above-mentioned surfaces of the upper-portion front-back-extended slat 15. The phrase the "slits SD that are parallel to the direction after reflection" means that, when an imaginary line is drawn to extend along the direction after reflection within each slit SD, the imaginary line does not cross over the above-mentioned surfaces of the upper-portion front-back-extended slat 15. As described above, each of the upper-portion front-back-extended slats 15 constitutes an integrated member with each of the lower-portion front-back-extended slats 13. The integrated member including the upper-portion front-back-extended slat 15 and the lower-portion front-back-extended slat 13 may be referred to as a "whole front-back-extended slat 19" hereinafter.

As illustrated in FIGS. 1, 4, 5, and 6, an upper end of each of the upper-portion front-back-extended slats 15 is in contact with the reflector 17. Accordingly, the upper-portion front-back-extended slats 15 are disposed at an interval at a front part of the entire region of the surface of the reflector 17 (the surface of the reflector 17 facing the ultrasonic emission unit), and slits SD are formed by the upper-portion front-back-extended slats 15, as illustrated in FIG. 2.

Figure 9:
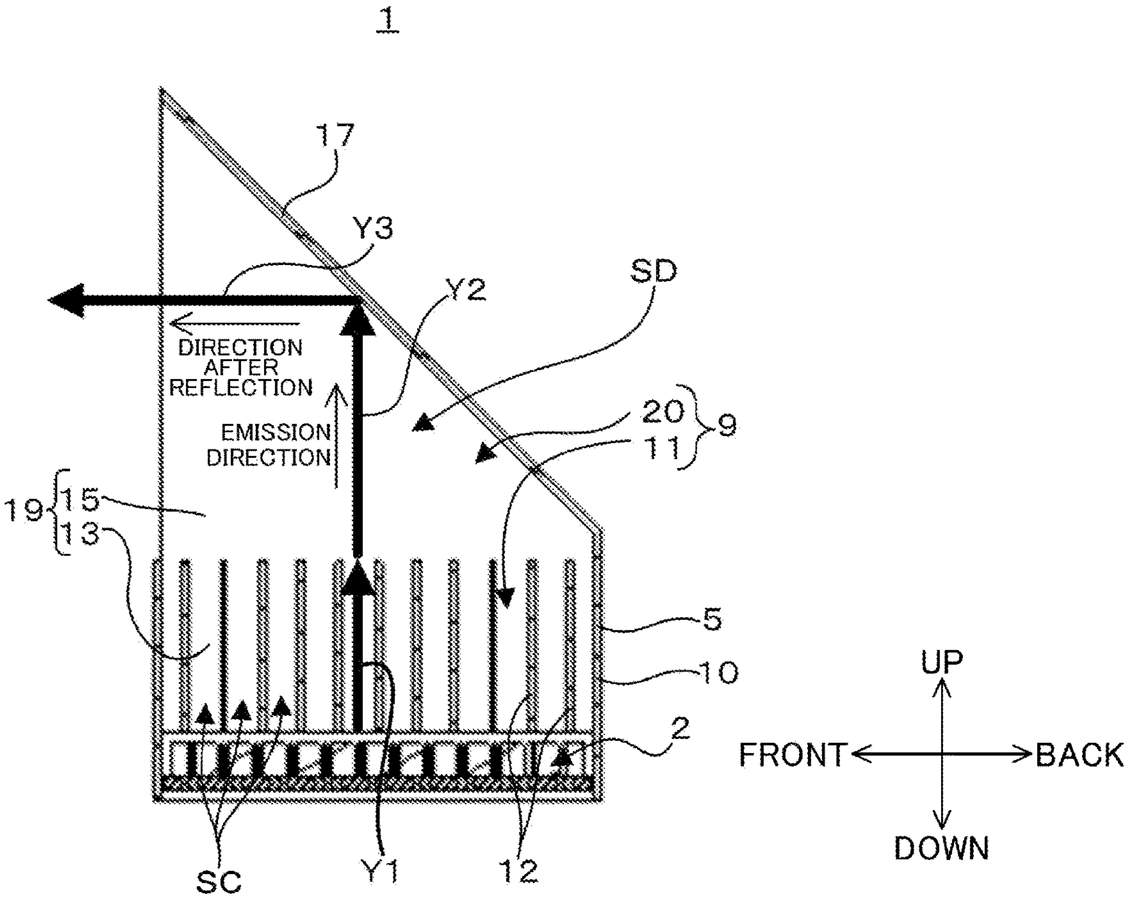
FIG. 9 is a view for describing an example of transmission of ultrasonic waves.

The speaker 1 emits ultrasonic waves in the following configuration according to the following embodiment. FIG. 9 is a view for describing an example of transmission of ultrasonic waves, and the cross-sectional view of FIG. 5 illustrates a path (a simplified path) of ultrasonic waves. The ultrasonic emission unit 2 emits ultrasonic waves in the emission direction (upwards). The ultrasonic waves emitted from the ultrasonic emission unit 2 are passed through the slits SC (also see FIG. 8) formed in the emission louver 11 of the lower speaker portion 3, as indicated with the arrow Y1, and are transmitted in the emission direction. The slits SC are slits parallel to the emission direction. Namely, each of the slits SC is a through-hole formed in the emission direction. Therefore, the direction of the ultrasonic waves does not change in the lower speaker portion 3 in the process of passing the ultrasonic waves through the slits SC.

The ultrasonic waves transmitted upwards after passing through the lower speaker portion 3 are passed through the slits SD of the reflection louver of the upper speaker portion 4, thereby progressing in the emission direction to reach the reflector 17, as indicated with the arrow Y2. The slits SD are slits parallel to the emission direction. Accordingly, the direction of the ultrasonic waves does not change in the upper speaker portion 4 until the ultrasonic waves reach the reflector 17.

The ultrasonic waves that have reached the reflector 17 are reflected by the reflector 17, followed by passing through the slits SD of the reflection louver 20 of the upper speaker portion 4 to progress in the direction after reflection, as indicated with the arrow Y3. The slits SD are slits parallel to the direction after reflection (reflected direction). Accordingly, the direction of the ultrasonic waves reflected by the reflector 17 does not change in the upper speaker portion 4.

As described above, the louver unit 9 is a member that is disposed between the ultrasonic emission unit 2 and the reflector 17, and a member in which slits (slits SC and slits SD) are formed so that the direction of ultrasonic waves does not change between the ultrasonic emission unit 2 and the reflector 17, and the direction of the ultrasonic waves reflected by the reflector 17 does not change. Specifically, because of the presence of the louver unit 9, the speaker 1 is configured to emit ultrasonic waves in a desired direction defined by a reflector angle of the reflector 17 without changing the direction of the ultrasonic waves between the ultrasonic emission unit 2 and the reflector 17, and without changing the direction of the ultrasonic waves reflected by the reflector 17.

In addition, the speaker 1 according to the present embodiment can effectively minimize potential damages of the ultrasonic emission unit 2, which may be caused by foreign matter, because the louver unit 9 is provided in the speaker 1. Specifically, the reflection louver 20 of the upper speaker portion 4 stops foreign matter from entering an inner area of the speaker 1. Because of the presence of the reflection louver 20, foreign matter larger than the slits SD cannot enter the slits SD, and foreign matter smaller than the slits SD is brought into with side surfaces or surfaces of the front ends of the upper-portion front-back-extended slats 15 to deflect the foreign matter so that the majority of the foreign matter cannot enter the inner area of the speaker 1.

Moreover, the foreign matter that has entered the slits SD of the reflection louver 20 is again stopped from entering the inner area by the emission louver 11 of the lower speaker portion 3. Specifically, the slits SC are finer (smaller) than the slits SD, and more strictly inhibit entry of foreign matter into the slits SC, compared to the slits SC. Therefore, a majority of foreign matter is brought into contact with and deflected by the side surfaces of the upper ends of the lower-portion left-right-extended slats 12, thereby discharging the foreign matter from the speaker 1 through the slits SD. Foreign matter may possibly enter the slits SC, but at this point, the foreign matter that could enter is limited to foreign matter of a small size, the speed of which is decreased as a result of the contact with various slats and other members, thereby significantly reducing impacts on the ultrasonic emission unit 2. As described above, potential damages of the ultrasonic emission unit 2 caused by foreign matter are effectively minimized.

Figure 10A:
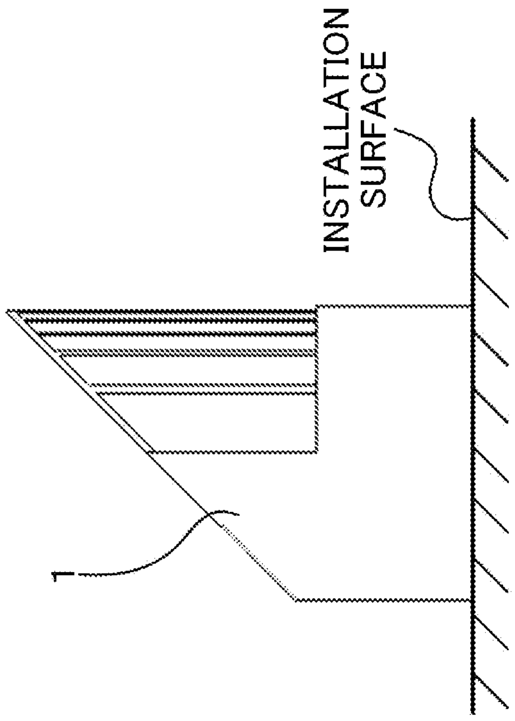
FIGS. 10A and 10B are views each illustrating a state where the speaker is installed.
Figure 10B:
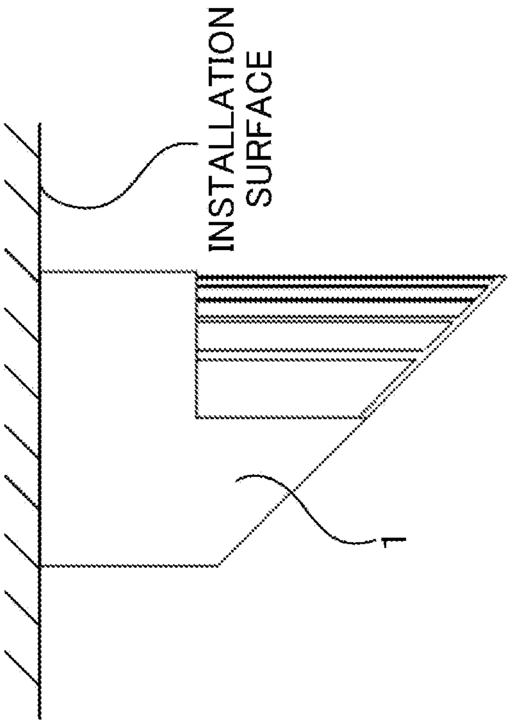

The speaker 1 according to the present embodiment is designed to be installed on an exterior of a body of a vehicle in various states. As illustrated in FIG. 10A, for example, the speaker 1 may be installed on an installation surface in an orientation such that the base plate 6 is vertically below the reflector 17. Opposite to the example of FIG. 10A, the speaker 1 may be installed on an installation surface in an orientation such that the base plate 6 is vertically above the reflector 17, as illustrated in FIG. 10B. In any orientation of the installation of the speaker 1, potential damages of the ultrasonic emission unit 2 can be minimized due to the presence of the louver unit 9.

As described above, the speaker 1 according to the present embodiment includes the ultrasonic emission unit 2, the reflector 17, and the louver unit 9 disposed between the ultrasonic emission unit 2 and the reflector 17. The ultrasonic emission unit 2 is configured to emit ultrasonic waves in an emission direction. The reflector 17 is disposed at the emission direction side of the ultrasonic emission unit 2, and is configured to reflect the ultrasonic waves emitted from the ultrasonic emission unit 2 in a predetermined direction (direction after reflection). Slits are formed in the louver unit 9 so that the direction of the ultrasonic waves does not change between the ultrasonic emission unit 2 and the reflector 17, and the direction of the ultrasonic waves reflected by the reflector 17 does not change. The louver unit 9 is configured to inhibit entry of foreign matter into the ultrasonic emission unit 2.

The reflector 17 is provided in the speaker 1 in the above-described configuration, thus ultrasonic waves can be emitted in a desired direction owing to a function of the reflector 17. In addition, the louver unit 9 is disposed between the ultrasonic emission unit 2 and the reflector 17, where the louver unit 9 passes through the ultrasonic waves without changing the direction of the ultrasonic waves, and inhibits entry of foreign matter into the ultrasonic emission unit 2. Therefore, potential damages of the ultrasonic emission unit 2 caused by foreign matter can be minimized without changing the direction of the ultrasonic waves. According to the present disclosure, the speaker 1, which is installed on an exterior of a body of a vehicle, can emit ultrasonic waves in a desired direction while minimizing potential damages of the ultrasonic emission unit 2 caused by foreign matter.

Particularly, the speaker 1 of the present embodiment includes the louver unit 9, and the louver unit 9 has the following configuration. Specifically, the louver unit 9 includes the reflection louver 20 and the emission louver 11. The reflection louver 20 is disposed on a path of ultrasonic waves reflected by the reflector 17, and includes the upper-portion front-back-extended slats 15 disposed to form slits that are parallel to the emission direction and the predetermined direction (the direction after reflection). The emission louver 11 is disposed on a path of ultrasonic waves emitted from the ultrasonic emission unit 2 and in a position avoiding the reflection louver 20. The emission louver 11 includes the lower-portion front-back-extended slats 13 and the lower-portion left-right-extended slats 12. The lower-portion front-back-extended slats 13 each extend parallel to the upper-portion front-back-extended slats 15 of the reflection louver 20. The lower-portion left-right-extended slats 12 each extend to cross over the upper-portion front-back-extended slats 15 of the reflection louver 20.

According to the above-described configuration, entry of foreign matter into the ultrasonic emission unit 2 is effectively inhibited by the functions of the reflection louver 20 and the emission louver 11, and potential damages of the ultrasonic emission unit 2 caused by foreign matter can be minimized without changing a direction of ultrasonic waves.

Second Embodiment

Figure 11:
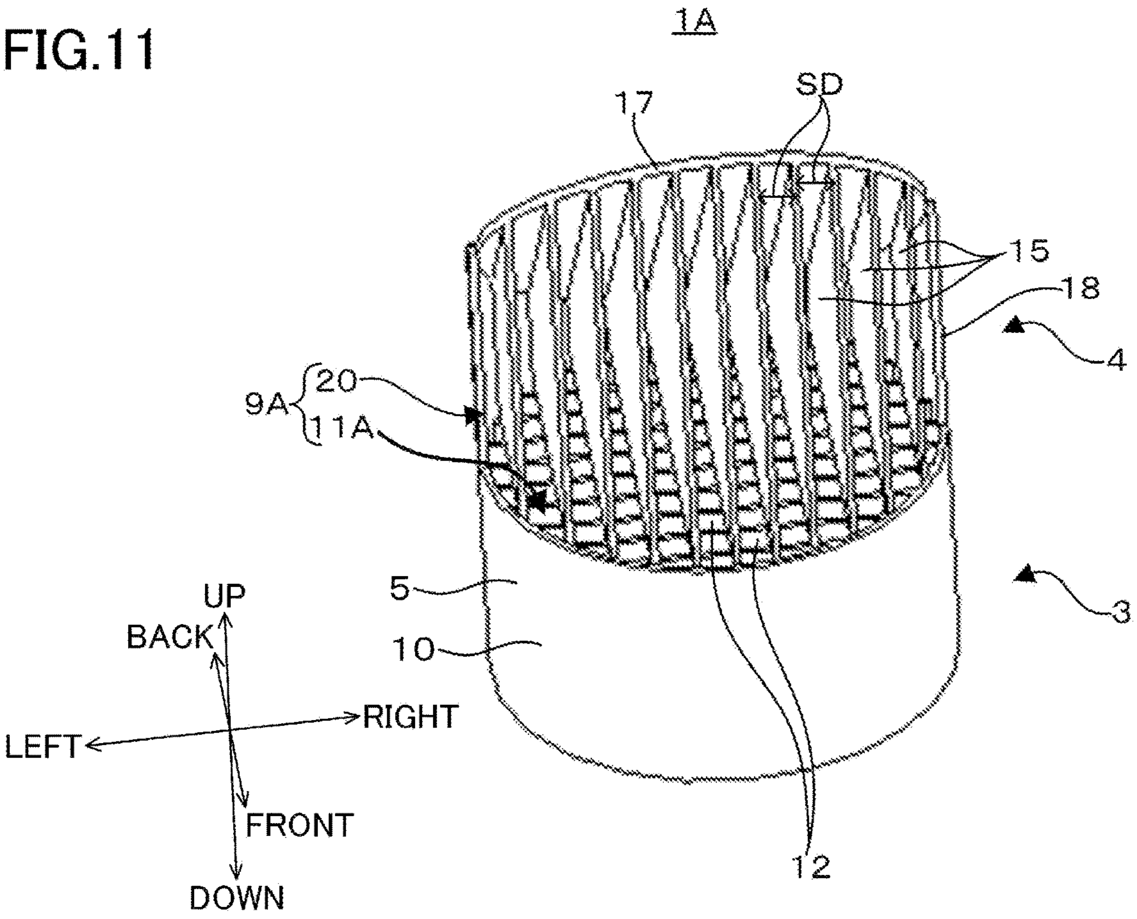
FIG. 11 is a perspective view illustrating a speaker according to a second embodiment of the present disclosure.
Figure 12:
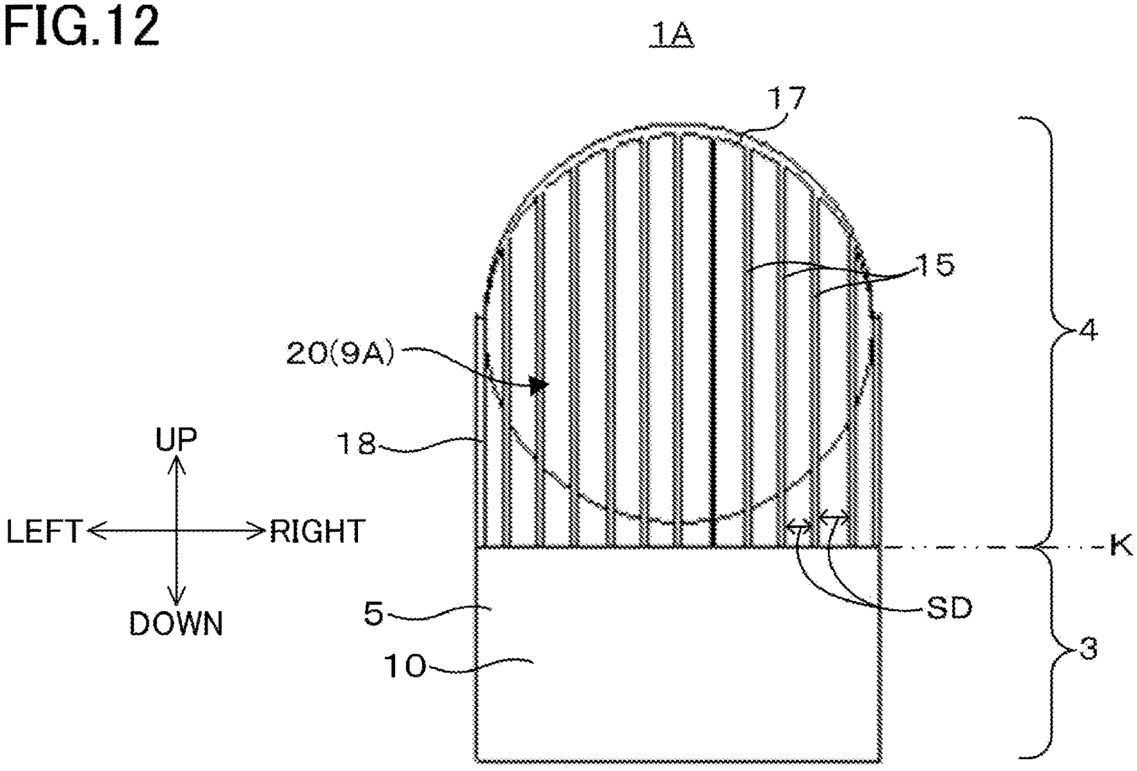
FIG. 12 is a front view illustrating the speaker according to the second embodiment.
Figure 13:
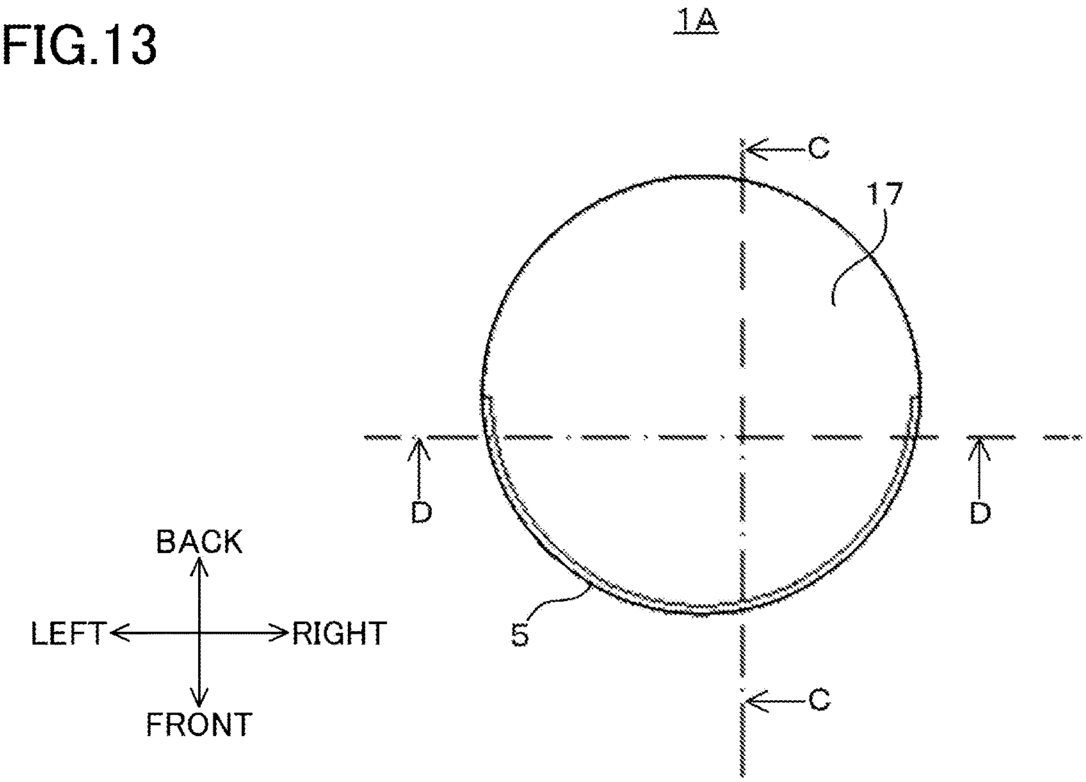
FIG. 13 is a plan view illustrating the speaker according to the second embodiment.
Figure 14:
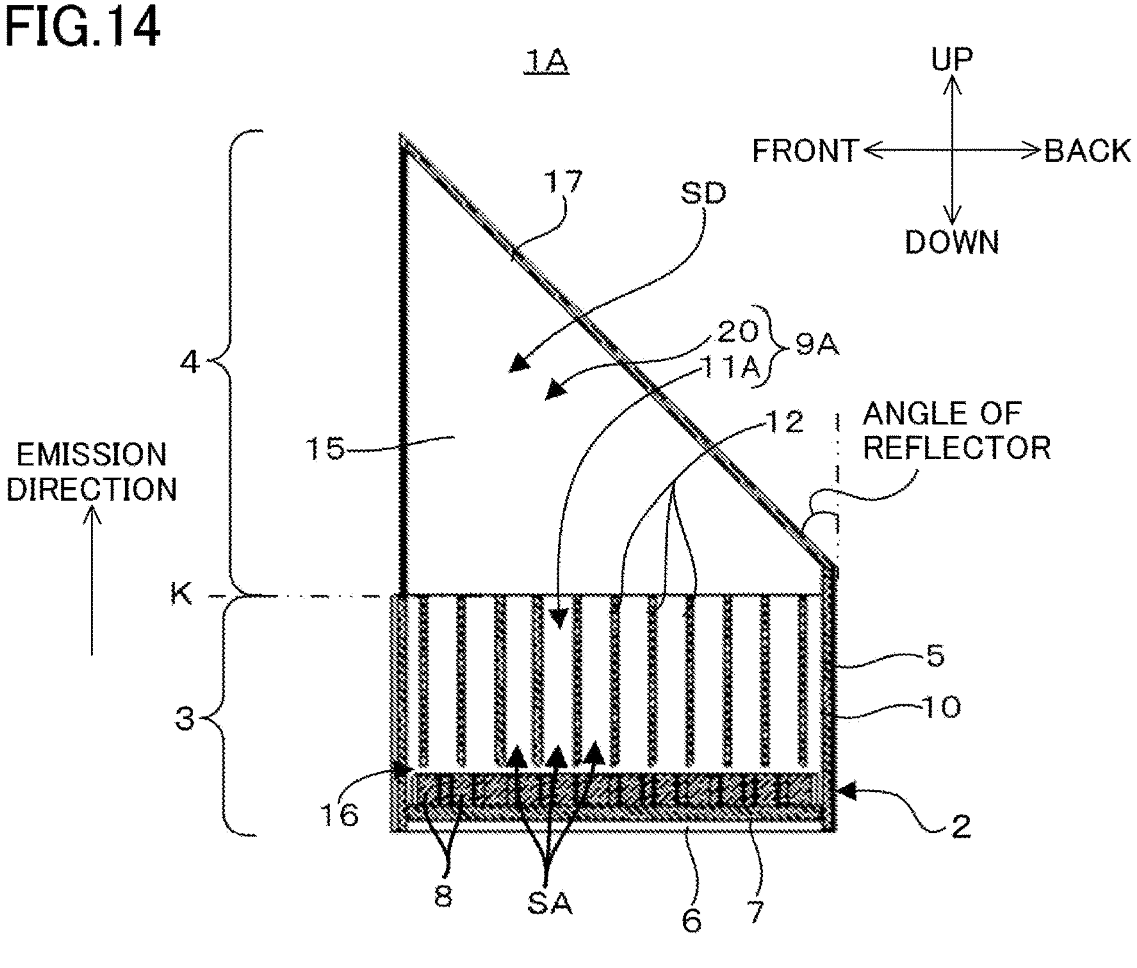
FIG. 14 is a cross-sectional view taken along the line C-C of FIG. 13.
Figure 15:
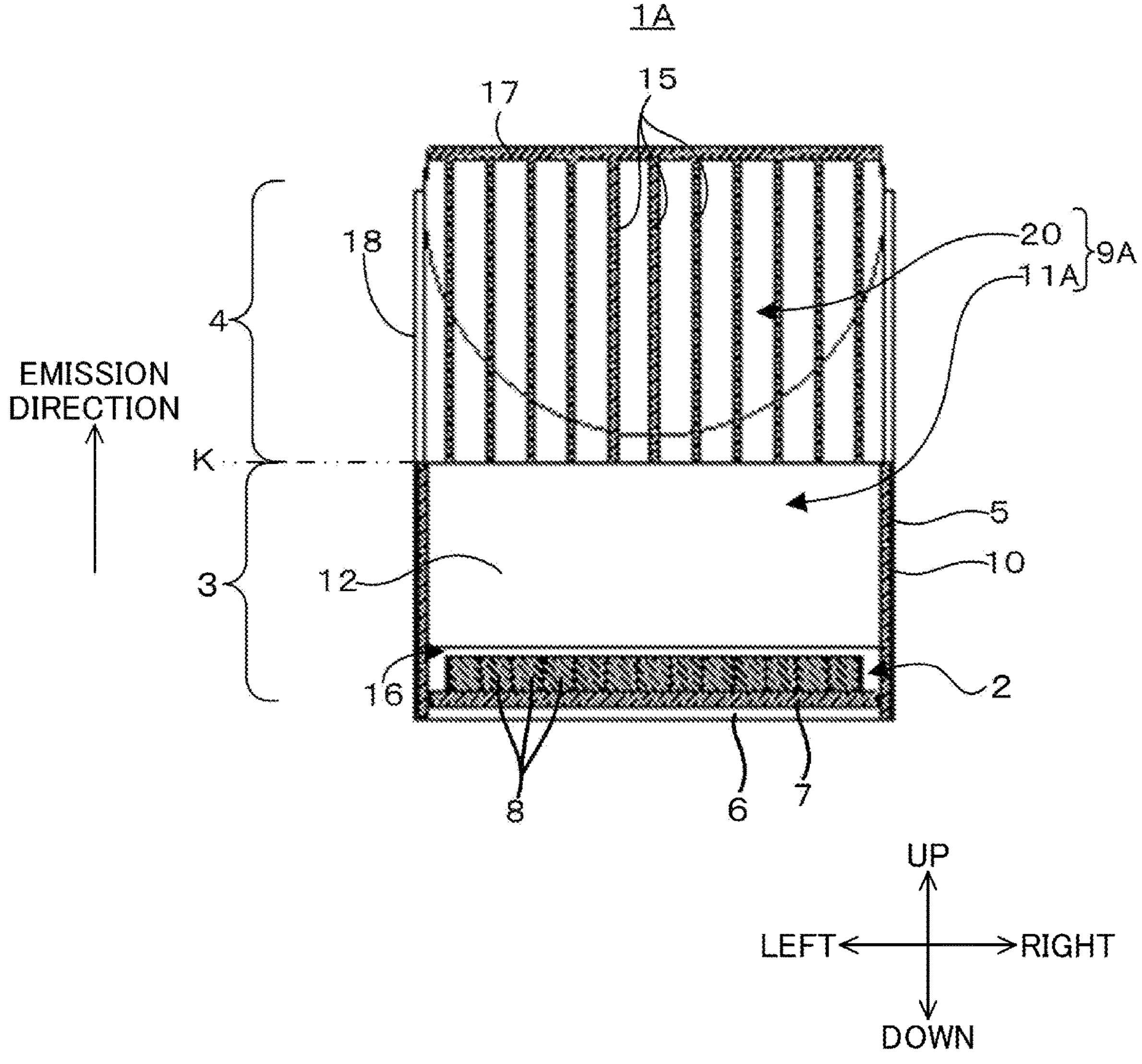
FIG. 15 is a cross-sectional view taken along the line D-D of FIG. 13.

Next, a second embodiment will be described. FIG. 11 is a perspective view illustrating a speaker 1A according to the present embodiment. FIG. 12 is a front view of the speaker 1A as viewed from front. FIG. 13 is a plan view of the speaker 1A as viewed from top. FIG. 14 is a cross-sectional view taken along the line C-C of FIG. 13. FIG. 15 is a cross-sectional view taken along the line D-D of FIG. 13. Throughout the following description of the second embodiment, elements identical to the elements of the first embodiment are identified with the same reference numerals, and description of the same elements may be omitted.

Structural characteristics of the speaker 1A will be described mainly through differences with the speaker 1 of the first embodiment, hereinafter. The speaker 1A includes a louver unit 9A. The louver unit 9A includes a reflection louver 20 disposed in an upper speaker portion 4, and an emission louver 11A disposed in a lower speaker portion 3. The emission louver 11A is different from the emission louver 11 of the first embodiment in the following points.

Specifically, as illustrated in FIGS. 11 to 15, the emission louver 11A does not include the lower-portion front-back-extended slats 13 of the first embodiment. In the first embodiment, more specifically, each of the upper-portion front-back-extended slats 15 constitutes an integrated member (a whole front-back-extended slat 19) with each of the lower-portion front-back-extended slats 13, where the upper-portion front-back-extended slat 15 is formed in a portion of the whole front-back-extended slat 19 corresponding to the upper speaker portion 4, and the lower-portion front-back-extended slat 13 is formed in a portion of the whole front-back-extended slat 19 corresponding to the lower speaker portion 3. In the present embodiment, there are the upper-portion front-back-extended slats 15, but there are no lower-portion front-back-extended slats 13. According to the configuration as described, in the lower speaker portion 3, slits SA (FIG. 14) are formed by the lower-portion left-right-extended slats 12 of the emission louver 11A.

As described above, the speaker 1A of the present disclosure includes the louver unit 9A, and the louver unit 9A has the following configuration. Specifically, the louver unit 9A includes the reflection louver 20 and the emission louver 11A. The reflection louver 20 is disposed on a path of ultrasonic waves reflected by the reflector 17, and includes the upper-portion front-back-extended slats 15 disposed to form slits (slits SD) that are parallel to the emission direction and the predetermined direction. The emission louver 11A is disposed on a path of ultrasonic waves emitted from the ultrasonic emission unit 2, and includes the lower-portion left-right-extended slats 12 extending to cross over the upper-portion front-back-extended slats 15 of the reflection louver 20.

According to the above-described configuration, effects similar to the first embodiment can be obtained. Specifically, the direction of the ultrasonic waves emitted from the ultrasonic emission unit 2 does not change due to the presence of the louver unit 9A. Therefore, the speaker 1A can emit ultrasonic waves in a desired direction. In addition, entry of foreign matter into the ultrasonic emission unit 2 is inhibited by the louver unit 9A, and potential damages of the ultrasonic emission unit 2 can be minimized.

Third Embodiment

Figure 16:
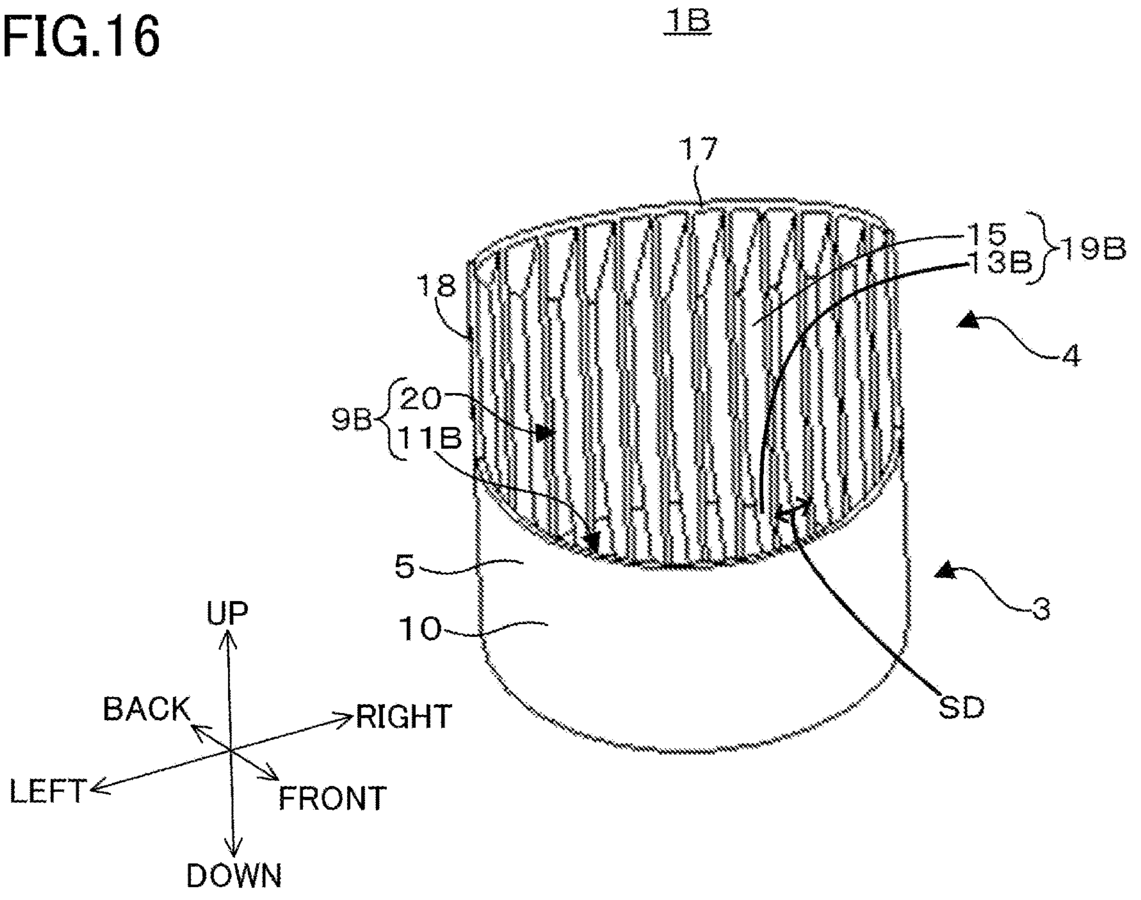
FIG. 16 is a perspective view illustrating a speaker according to a third embodiment of the present disclosure.
Figure 17:
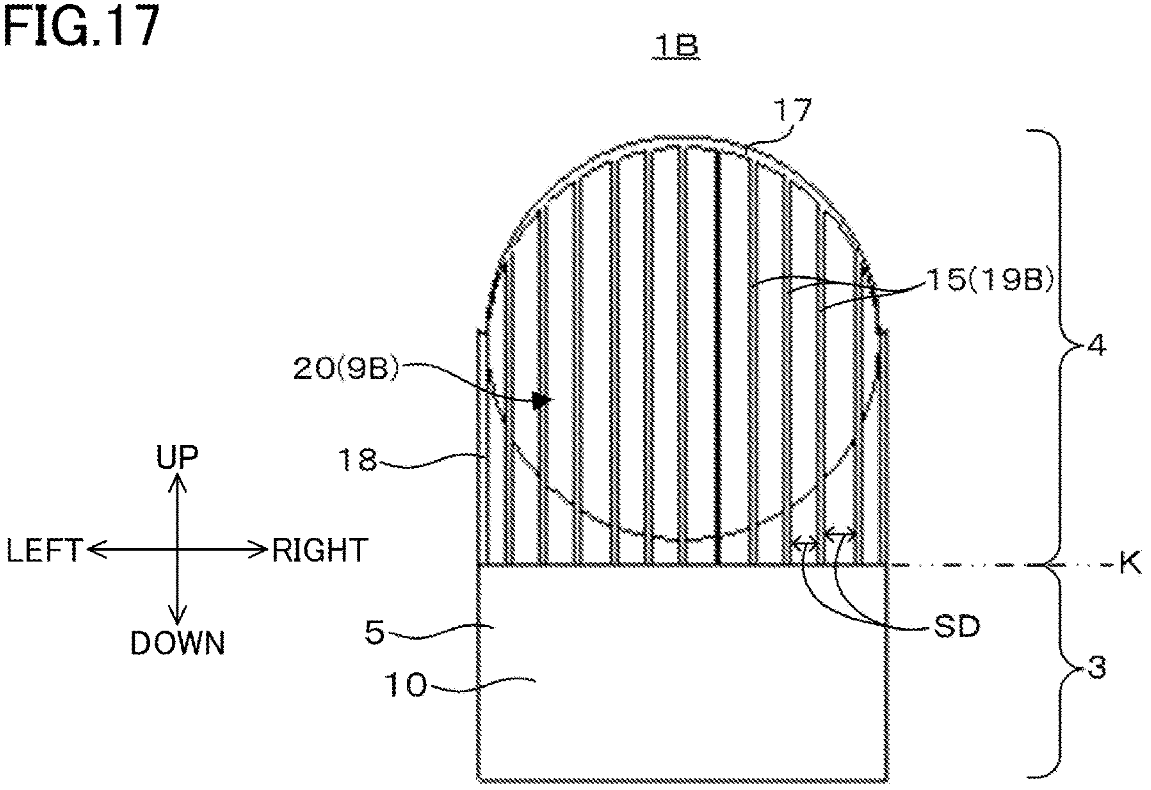
FIG. 17 is a front view illustrating the speaker according to the third embodiment.
Figure 18:
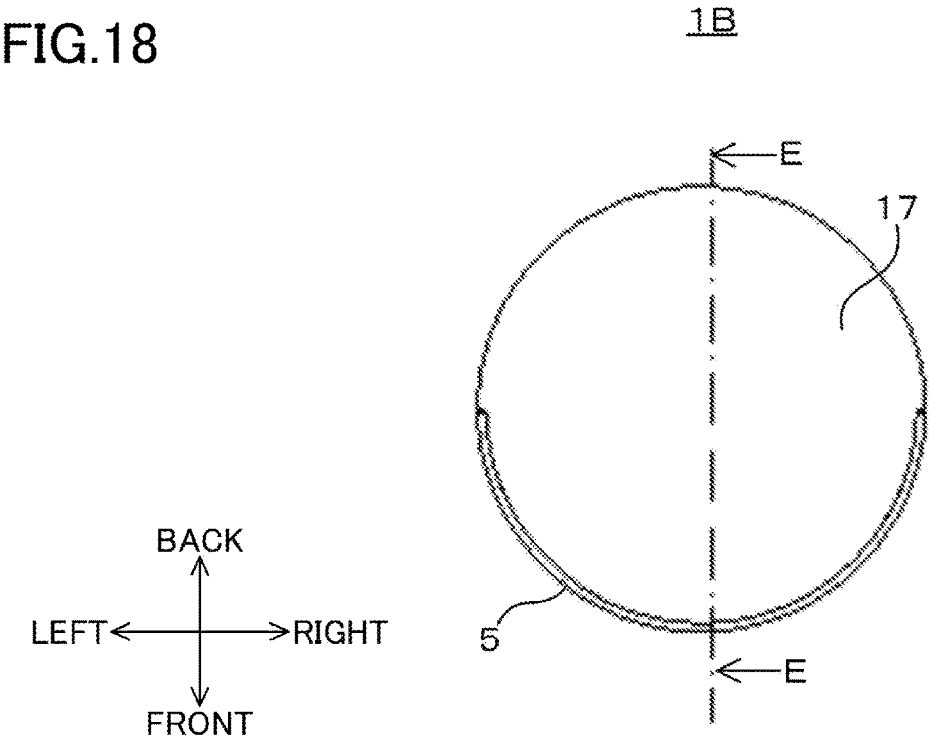
FIG. 18 is a plan view illustrating the speaker according to the third embodiment.
Figure 19:
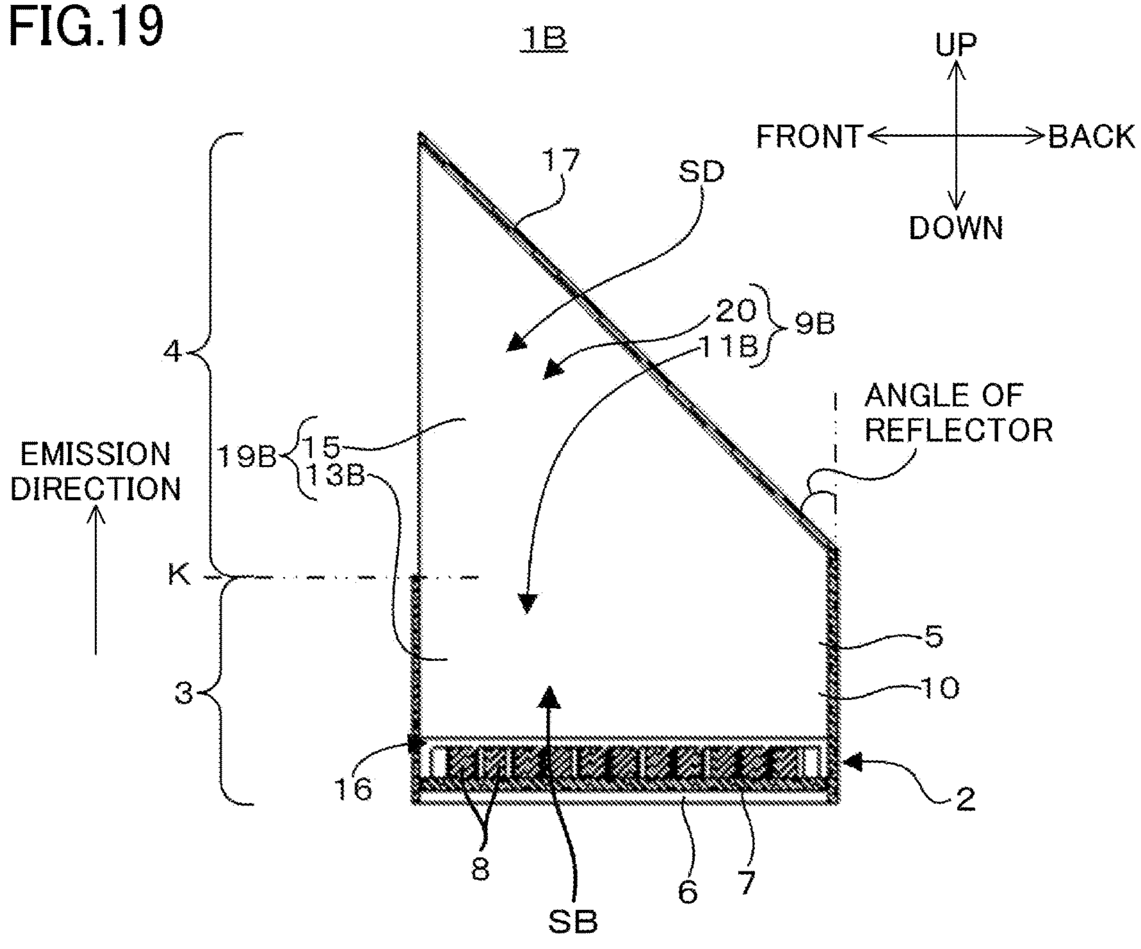
FIG. 19 is a cross-sectional view taken along the line E-E of FIG. 18.

Next, a third embodiment will be described. FIG. 16 is a perspective view illustrating a speaker 1B according to the present embodiment. FIG. 17 is a front view of the speaker 1B as viewed from front. FIG. 18 is a plan view of the speaker 1B as viewed from top. FIG. 19 is a cross-sectional view taken along the line E-E of FIG. 18. Throughout the following description of the third embodiment, elements identical to the elements of the first embodiment are identified with the same reference numerals, and description of the same elements may be omitted.

Structural characteristics of the speaker 18 will be described mainly through differences with the speaker 1 of the first embodiment, hereinafter. As illustrated in FIGS. 16 to 19, the speaker 1B includes a louver unit 9B. The louver unit 9B includes a reflection louver 20 disposed in an upper speaker portion 4 and an emission louver 11B disposed in a lower speaker portion 3. The emission louver 11B is different from the emission louver 11 of the first embodiment in the following points.

Specifically, the emission louver 11B does not include the lower-portion left-right-extended slats 12 of the first embodiment. More specifically, the speaker 1B of the present embodiment has a configuration where the lower-portion left-right-extended slats 12 are removed from the speaker 1 of the first embodiment. However, a cutout (a cutout through which the lower-portion left-right-extended slat 12 is passed in the first embodiment) is not formed in each of whole front-back-extended slats 19B. According to the above-described configuration, the slits SB (FIG. 19) are formed by the lower-portion front-back-extended slats 13B in the lower speaker portion 3.

As described above, the speaker 1B of the present embodiment includes the louver unit 9B, and the louver unit 9B has the following configuration. Specifically, the louver unit 9B includes the reflection louver 20 and the emission louver 11B. The reflection louver 20 is disposed on a path of ultrasonic waves reflected by the reflector 17, and includes the upper-portion front-back-extended slats 15 disposed to form slits that are parallel to the emission direction and the predetermined direction. The emission louver 11B is disposed on a path of ultrasonic waves emitted from the ultrasonic emission unit 2 and in a position avoiding the reflection louver 20. The emission louver 11B includes the lower-portion left-right-extended slats 12 extending parallel to the upper-portion front-back-extended slat 15 of the reflection louver 20.

According to the above-described configuration, effects similar to the first embodiment can be obtained. Specifically, the direction of the ultrasonic waves emitted from the ultrasonic emission unit 2 does not change due to the presence of the louver unit 9B. Therefore, the speaker 1B can emit ultrasonic waves in a desired direction. In addition, entry of foreign matter into the ultrasonic emission unit 2 is inhibited by the louver unit 9B, and potential damages of the ultrasonic emission unit 2 can be minimized.

Fourth Embodiment

Figure 20:
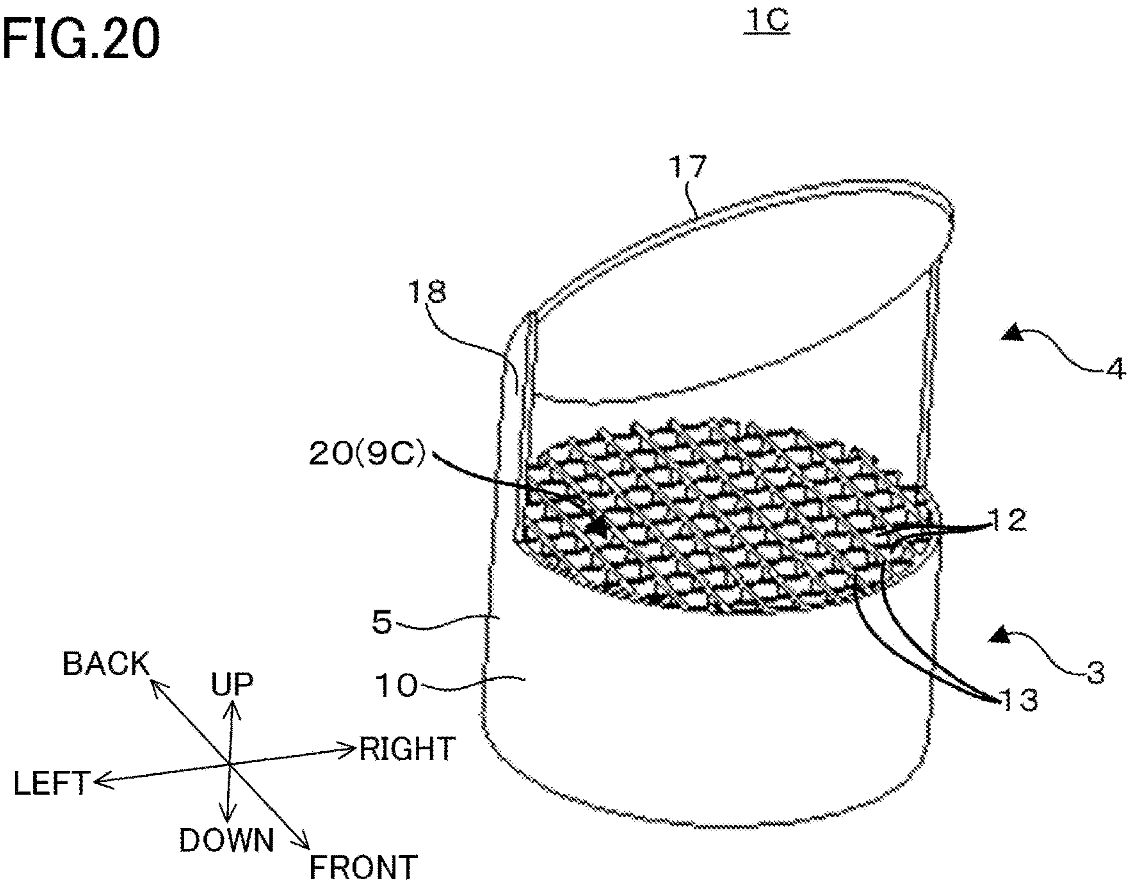
FIG. 20 is a perspective view illustrating a speaker according to a fourth embodiment of the present disclosure.
Figure 21:
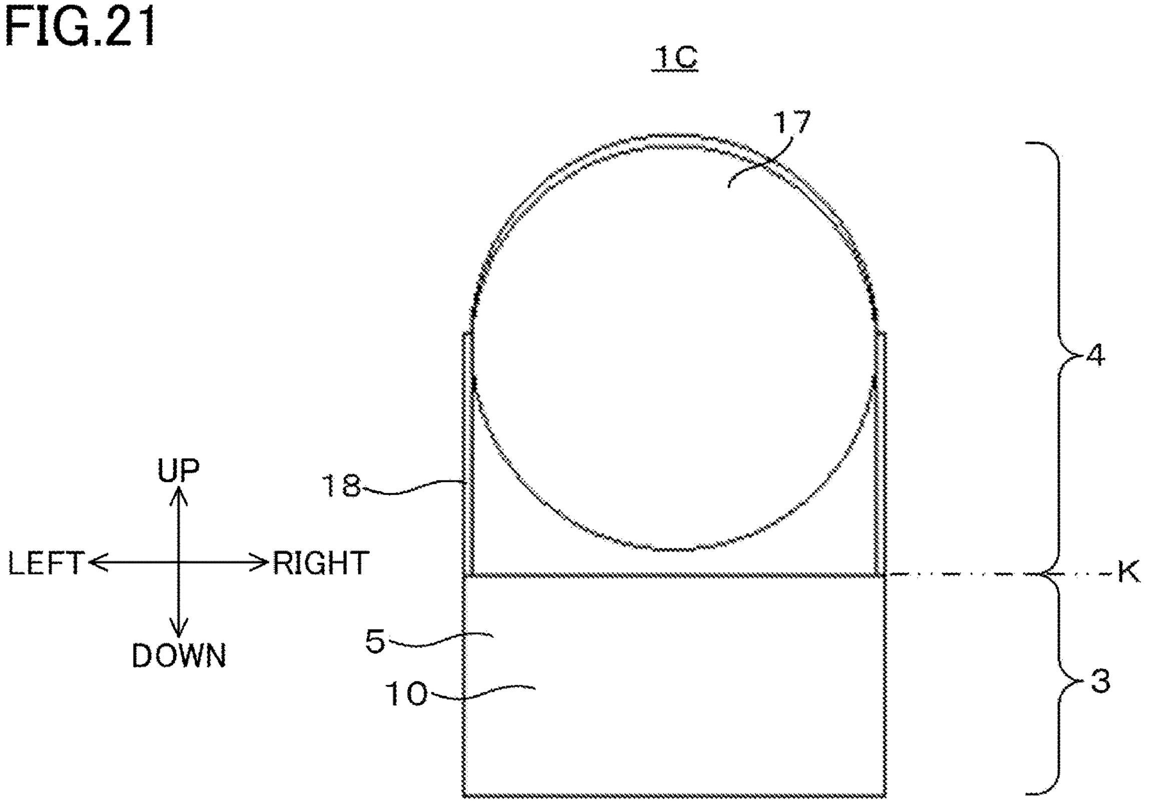
FIG. 21 is a front view illustrating the speaker according to the fourth embodiment.
Figure 22:
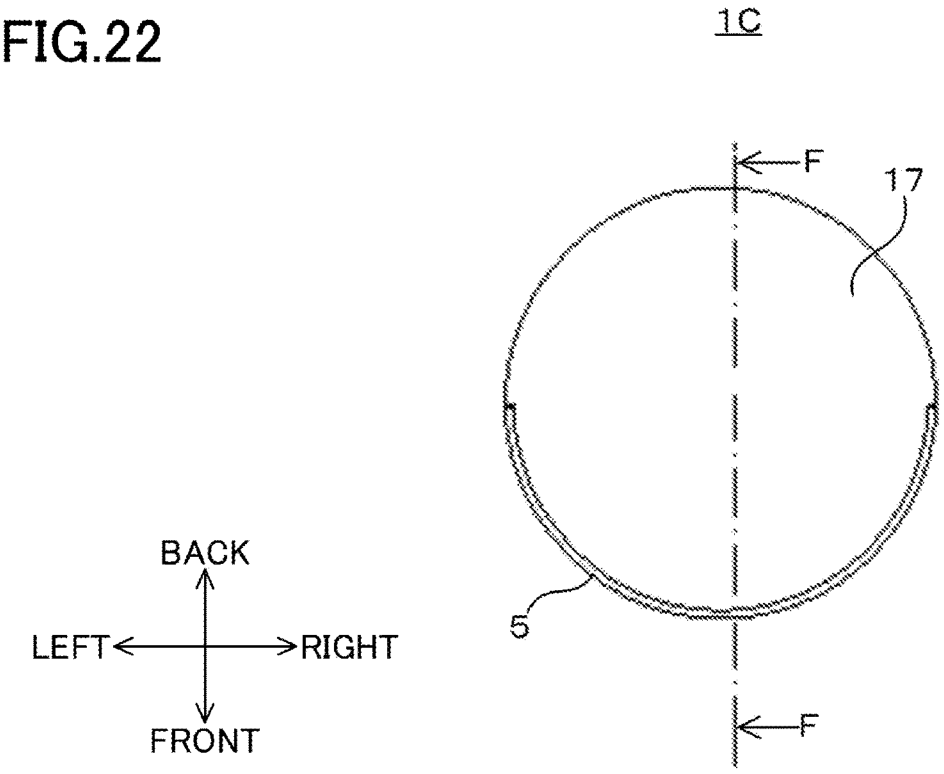
FIG. 22 is a plan view illustrating the speaker according to the fourth embodiment.
Figure 23:
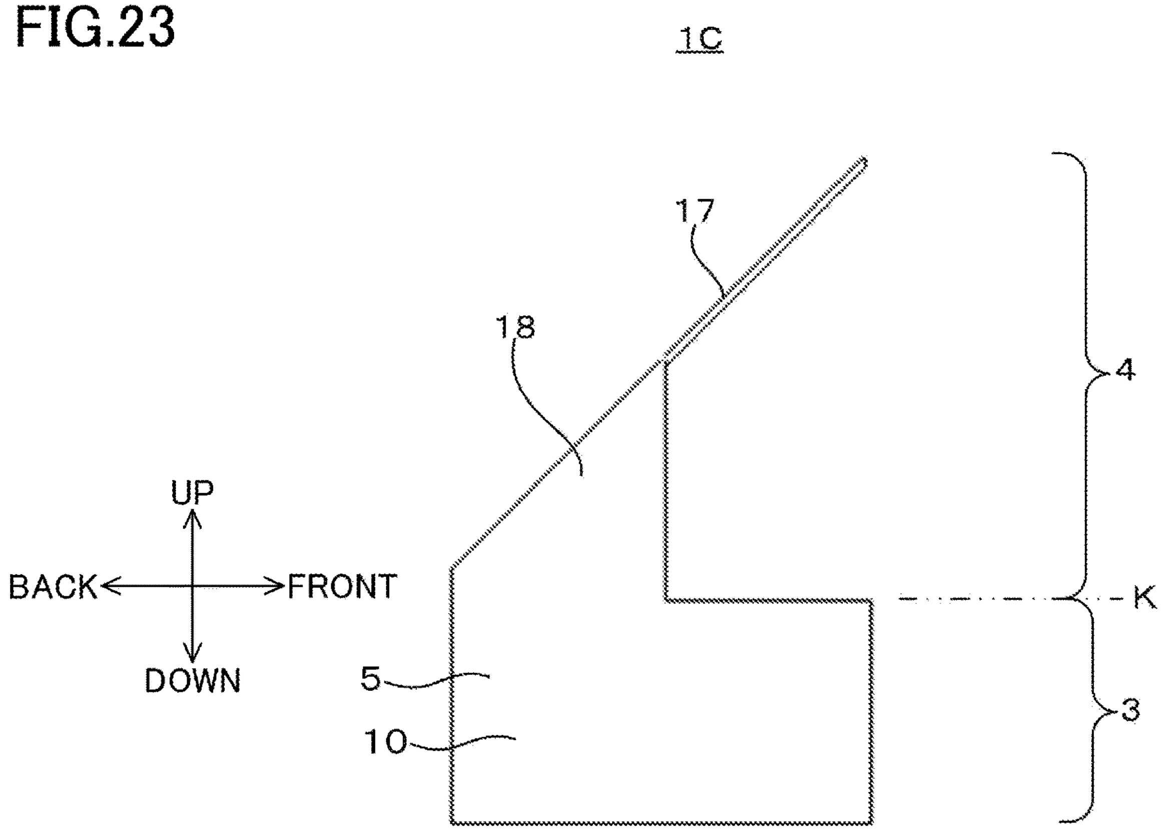
FIG. 23 is a left side view illustrating the speaker according to the fourth embodiment.
Figure 24:
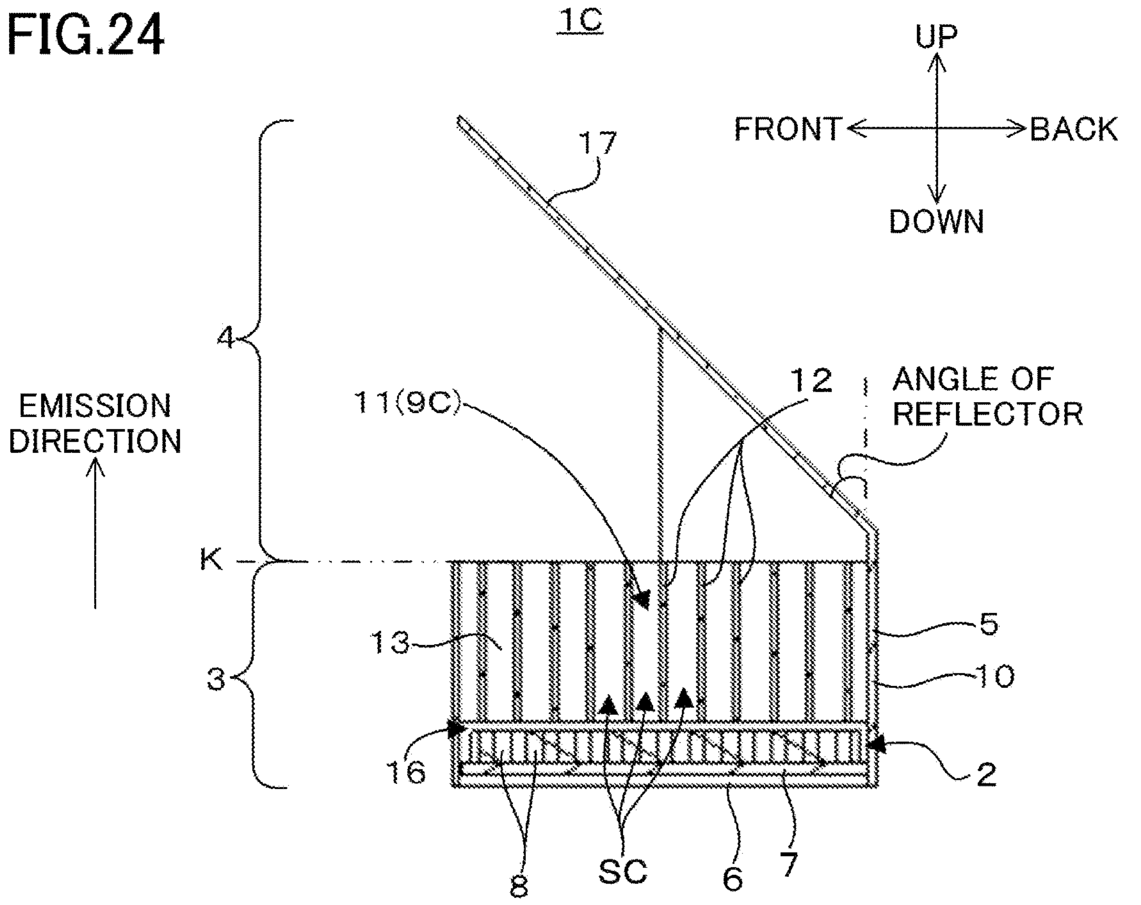
FIG. 24 is a cross-sectional view taken along the line F-F of FIG. 22.

Next, a fourth embodiment will be described. FIG. 20 is a perspective view illustrating a speaker 1C according to the present embodiment. FIG. 21 is a front view of the speaker 1C as viewed from front. FIG. 22 is a plan view of the speaker 1C as viewed from top. FIG. 23 is a left side view of the speaker 1C as viewed from left. FIG. 24 is a cross-sectional view taken along the line F-F of FIG. 22. Throughout the following description of the fourth embodiment, elements identical to the elements of the first embodiment are identified with the same reference numerals, and description of the same elements may be omitted.

Structural characteristics of the speaker 1C will be described mainly through differences with the speaker 1 of the first embodiment, hereinafter. As illustrated in FIGS. 20 to 24, the speaker 1C includes a louver unit 9C. The louver unit 9C includes an emission louver 11 disposed in the lower speaker portion 3. Specifically, the louver unit 9C does not include the reflection louver 20 of the first embodiment. In the point as mentioned, the speaker 1C is structurally different from the speaker 1 of the first embodiment. According to the above-described configuration, the slits SC (FIG. 24) are formed by the lower-portion left-right-extended slats 12 and the lower-portion front-back-extended slats 13 in the lower speaker portion 3.

As described above, the louver unit 9C includes the emission louver 11 that is a louver disposed on a path of ultrasonic waves emitted from the ultrasonic emission unit 2 and in a position avoiding a path of ultrasonic waves reflected by the reflector 17. A louver is not disposed or is absent on the path of the ultrasonic waves reflected by the reflector 17.

According to the above-described configuration, effects similar to the first embodiment can be obtained. Specifically, the direction of the ultrasonic waves emitted from the ultrasonic emission unit 2 does not change due to the presence of the louver unit 9C. Therefore, the speaker 1C can emit ultrasonic waves in a desired direction. In addition, entry of foreign matter into the ultrasonic emission unit 2 is inhibited by the louver unit 90, and potential damages of the ultrasonic emission unit 2 can be minimized.

Modification Example of Fourth Embodiment

Figure 25:
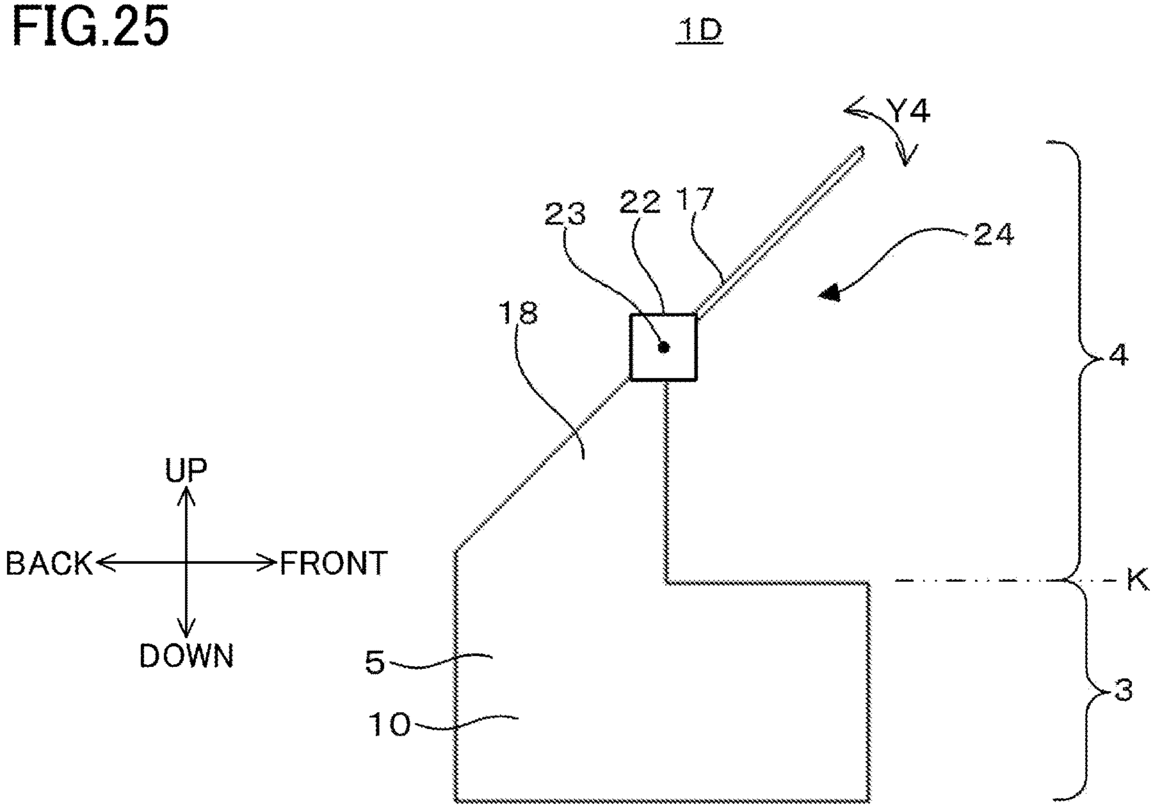
FIG. 25 is a left side view illustrating a speaker according to a modification example of the fourth embodiment.

Next, a modification example of the fourth embodiment will be described. FIG. 25 is a left side view illustrating a speaker 1D according to the present modification example. The speaker 1D of the present modification example is different from the speaker 10 of the fourth embodiment in that the speaker 1D includes a below-described reflector angle adjustment mechanism 22.

As illustrated in FIG. 25, the speaker 1D includes the reflector angle adjustment mechanism 22. The reflector angle adjustment mechanism 22 includes a shaft 23 extending along the left-right direction. The shaft 23 is passed through the reflector 17 and is fixed to the reflector 17. The reflector angle adjustment mechanism 22 is configured to switch between a locked state and an unlocked state. In the locked state, the reflector 17 is fixed to the cylindrical extended portion 18 so that the reflector 17 does not move. In the unlocked state, the reflector 17 is rotatable within a certain range in the direction indicated with the arrow Y4 in FIG. 25.

The speaker 1D does not include the reflection louver 20 of the first embodiment (does not include a louver on a path of ultrasonic waves reflected by the reflector 17), and includes a space 24 formed in a region corresponding to the reflection louver 20 of the first embodiment. Because of the presence of the space 24, the arrangement of the reflector 17 can be changed afterward. In the present embodiment, the speaker 1D is configured to suitably use the space 24 so that the orientation of the reflector 17 is changeable to change the reflected direction (the predetermined direction).

A user can adjust a reflector angle of the reflector 17 (the arrangement of the reflector 17) afterward using the reflector angle adjustment mechanism 22. Specifically, a user turns the reflector angle adjustment mechanism 22 to the unlocked state, and adjusts the reflector angle of the reflector 17, followed by turning back to the locked state to fix the reflector 17 in the unmovable state.

In the present modification example, the reflector angle adjustment mechanism 22 enables manual adjustment of the reflector angle of the reflector 17 (the arrangement of the reflector 17). The reflector angle adjustment mechanism 22 may include a motor, a power transmission mechanism, a motor driver, etc. so that the reflector angle adjustment mechanism 22 is configured to automatically adjust the reflector angle of the reflector 17 (the arrangement of the reflector 17) based on an instruction of a user.

Several embodiments have been described above, but each of the embodiments above merely describe a concrete example for carrying out the present invention. The embodiments above shall not be construed as limiting the scope of the present invention. Specifically, the present invention may be carried out in various embodiments without departing from the spirit or scope of the present invention.

For example, in the first embodiment, each of the upper-portion front-back-extended slats 15 constitutes an integrated member with each of the lower-portion front-back-extended slats 13. Regarding the configuration of the slats, each upper-portion front-back-extended slat 15 and each lower-portion front-back-extended slat 13 may be separate members. This configuration of the slats may be also applied to the third embodiment.

In the first embodiment, moreover, the lower speaker portion 3 has a configuration where each of the lower-portion left-right-extended slats 12 and each of the lower-portion front-back-extended slats 13 cross each other at a right angle (90°). Regarding the configuration of the slats, each of the lower-portion left-right-extended slats 12 and each of the lower-portion front-back-extended slats 13 may cross each other at an angle that is not a right angle (90°). This configuration of the slats may be also applied to the fourth embodiment.

According to the present invention configured to the above-described manner, the speaker includes the reflector. Therefore, ultrasonic waves can be emitted in a desired direction due to a function of the reflector. In addition, the louver unit, which passes through ultrasonic waves without changing the direction of the ultrasonic waves and inhibits entry of foreign matter into the ultrasonic emission unit, is disposed between the ultrasonic emission unit and the reflector. Therefore, potential damages of the ultrasonic emission unit caused by foreign matter can be minimized without changing the direction of the ultrasonic waves. Specifically, according to the present disclosure, a speaker, which is installed on an exterior of a body of a vehicle, can emit ultrasonic waves in a desired direction, while minimizing potential damages of an ultrasonic emission unit caused by foreign matter.

What is claimed is:

1. A speaker configured to emit ultrasonic waves, the speaker comprising:

an ultrasonic emission unit configured to emit ultrasonic waves in an emission direction;

a reflector disposed at a side of the ultrasonic emission unit from which the ultrasonic waves are emitted, the reflector being configured to reflect the ultrasonic waves emitted from the ultrasonic emission unit in a predetermined direction; and a louver unit disposed between the ultrasonic emission unit and the reflector, the louver unit including slits formed therein in a manner such that the slits do not change a direction of the ultrasonic waves between the ultrasonic emission unit and the reflector, and do not change a direction of the ultrasonic waves reflected by the reflector, and the louver unit being configured to inhibit entry of foreign matter into the ultrasonic emission unit.

2. The speaker according to claim 1, wherein the louver unit includes:

a reflection louver disposed on a path of the ultrasonic waves reflected by the reflector, the reflection louver including slats disposed to form the slits that are parallel to the emission direction and the predetermined direction; and an emission louver disposed on a path of the ultrasonic waves emitted from the ultrasonic emission unit and in a position avoiding the reflection louver, the emission louver including slats extending parallel to the slats of the reflection louver, and slats extending to cross the slats of reflection louver.

3. The speaker according to claim 2, wherein each of the slats of the reflection louver constitutes an integrated member with each of the slats of the emission louver, which extend parallel to the slats of the reflection louver.

4. The speaker according to claim 1, wherein the louver unit includes:

a reflection louver disposed on a path of the ultrasonic waves reflected by the reflector, the reflection louver including slats disposed to form the slits parallel to the emission direction and the predetermined direction; and an emission louver disposed on a path of the ultrasonic waves emitted from the ultrasonic emission unit and in a position avoiding the reflection louver, the emission louver including slats extending to cross the slats of the reflection louver.

5. The speaker according to claim 1, wherein the louver unit includes:

a reflection louver disposed on a path of the ultrasonic waves reflected by the reflector, the reflection louver including slats disposed to form the slits parallel to the emission direction and the predetermined direction; and an emission louver disposed on a path of the ultrasonic waves emitted from the ultrasonic emission unit and in a position avoiding the reflection louver, the emission louver including slats extending parallel to the slats of the reflection louver.

6. The speaker according to claim 5, wherein each of the slats of the reflection louver constitutes an integrated member with each of the slats of the emission louver, which extend parallel to the slats of the reflection louver.

7. The speaker according to claim 1, wherein the louver unit includes an emission louver disposed on a path of the ultrasonic waves emitted from the ultrasonic emission unit and in a position avoiding a path of the ultrasonic waves reflected by the reflector, and a louver is absent on the path of the ultrasonic waves reflected by the reflector.

8. The speaker according to claim 7, wherein a space is formed by the absence of the louver on the path of the ultrasonic waves reflected by the reflector, and the reflector is configured to use the space so that an arrangement of the reflector is changeable to change the predetermined direction.

* * * * *